US011673256B2

(12) United States Patent
Angood

(10) Patent No.: US 11,673,256 B2
(45) Date of Patent: Jun. 13, 2023

(54) COORDINATE POSITIONING MACHINE

(71) Applicant: RENISHAW PLC, Wotton-under-Edge (GB)

(72) Inventor: Stephen Mark Angood, Portreath (GB)

(73) Assignee: RENISHAW PLC, Wotton-under-Edge (GB)

( * ) Notice: Subject to any disclaimer, the term of this patent is extended or adjusted under 35 U.S.C. 154(b) by 183 days.

(21) Appl. No.: 17/195,158

(22) Filed: Mar. 8, 2021

(65) Prior Publication Data

US 2021/0187729 A1 Jun. 24, 2021

Related U.S. Application Data

(63) Continuation of application No. 16/649,065, filed as application No. PCT/GB2018/052928 on Oct. 12, 2018, now Pat. No. 10,967,502.

(30) Foreign Application Priority Data

Oct. 13, 2017 (GB) ...................................... 1716793

(51) Int. Cl.
*G01B 5/008* (2006.01)
*B25J 9/02* (2006.01)
(Continued)

(52) U.S. Cl.
CPC ............. *B25J 9/023* (2013.01); *B25J 9/0039* (2013.01); *B25J 9/0057* (2013.01); *B25J 9/1623* (2013.01);
(Continued)

(58) Field of Classification Search
CPC ...................................................... G01B 5/008
(Continued)

(56) References Cited

U.S. PATENT DOCUMENTS 4,976,582 A 12/1990 Clavel
4,988,244 A 1/1991 Sheldon et al.
(Continued)

FOREIGN PATENT DOCUMENTS

BE 1000768 A4 3/1989
CZ 2010-178 A3 9/2011
(Continued)

OTHER PUBLICATIONS

Jun. 26, 2020 International Search Report issued in International Patent Application No. PCT/GB2020/050745.
(Continued)

*Primary Examiner* — George B Bennett
(74) *Attorney, Agent, or Firm* — Oliff PLC

(57) ABSTRACT

A coordinate positioning machine that includes: a structure moveable within a working volume of the machine, a hexapod metrology arrangement for measuring the position of the structure within the working volume, and a non-hexapod drive arrangement for moving the structure around the working volume. Also, a coordinate positioning machine including a structure moveable within a working volume of the machine, a drive arrangement for moving the structure around the working volume in fewer than six degrees of freedom, and a metrology arrangement for measuring the position of the structure within the working volume in more degrees of freedom than the drive arrangement.

23 Claims, 15 Drawing Sheets

(51) Int. Cl.
*B25J 9/00* (2006.01)
*B25J 9/16* (2006.01)
*B25J 17/02* (2006.01)

(52) U.S. Cl.
CPC .......... *B25J 17/0216* (2013.01); *G01B 5/008* (2013.01); *G05B 2219/50162* (2013.01)

(58) Field of Classification Search
USPC .......................................................... 33/503
See application file for complete search history.

(56) References Cited

U.S. PATENT DOCUMENTS

| | | |
|---|---|---|
| 5,012,587 A | 5/1991 | David |
| 5,028,180 A | 7/1991 | Sheldon et al. |
| 5,354,158 A | 10/1994 | Sheldon et al. |
| 5,428,446 A | 6/1995 | Ziegert et al. |
| 5,466,085 A | 11/1995 | Sheldon et al. |
| 5,489,168 A | 2/1996 | Sheldon et al. |
| 5,575,597 A | 11/1996 | Bailey et al. |
| 5,604,593 A | 2/1997 | McMurtry |
| 5,681,981 A | 10/1997 | McMurtry |
| 5,797,191 A | 8/1998 | Ziegert |
| 5,857,815 A | 1/1999 | Bailey et al. |
| 5,870,834 A * | 2/1999 | Sheldon ................ G01B 5/004 33/502 |
| 5,909,939 A | 6/1999 | Fugmann |
| 5,960,672 A | 10/1999 | Pritschow et al. |
| 6,226,884 B1 | 5/2001 | McMurtry |
| 6,581,437 B2 | 6/2003 | Chrystall et al. |
| 6,662,461 B2 | 12/2003 | McMurtry |
| 6,882,901 B2 | 4/2005 | Gong |
| 6,918,188 B2 | 7/2005 | McMurtry |
| 7,174,652 B2 | 2/2007 | McMurtry |
| 7,627,956 B2 * | 12/2009 | Pettersson .............. G01B 5/012 33/503 |
| 7,753,642 B2 | 7/2010 | Bosscher et al. |
| 7,793,425 B2 * | 9/2010 | Bailey ................... G01B 5/008 33/503 |
| 7,797,849 B2 * | 9/2010 | Gomez ................... G01B 5/14 33/503 |
| 7,810,248 B2 | 10/2010 | McMurtry |
| 7,841,097 B2 | 11/2010 | Evans et al. |
| 8,352,212 B2 * | 1/2013 | Fetter ................. G01B 21/047 33/503 |
| 8,672,575 B2 | 3/2014 | McMurtry |
| 9,694,504 B2 | 7/2017 | Gratsias et al. |
| 9,739,606 B2 * | 8/2017 | Jonas .................. G01B 5/0014 |
| 9,797,706 B2 | 10/2017 | Jordil et al. |
| 10,816,335 B2 | 10/2020 | McMurtry et al. |
| 10,830,567 B2 | 11/2020 | Angood |
| 10,967,502 B2 | 4/2021 | Angood |
| 11,300,396 B2 | 4/2022 | Angood |
| 11,300,408 B2 | 4/2022 | McMurtry et al. |
| 2001/0042395 A1 * | 11/2001 | McMurtry ......... B23Q 17/2233 73/1.79 |
| 2002/0029610 A1 | 3/2002 | Chrystall et al. |
| 2003/0005786 A1 * | 1/2003 | Stuart ................. B25J 17/0266 409/235 |
| 2003/0197482 A1 | 10/2003 | Osuka et al. |
| 2005/0166413 A1 | 8/2005 | Crampton |
| 2008/0271332 A1 | 11/2008 | Jordil et al. |
| 2009/0066100 A1 | 3/2009 | Bosscher et al. |
| 2009/0183550 A1 | 7/2009 | Valasek et al. |
| 2009/0194664 A1 | 8/2009 | Evans et al. |
| 2009/0260243 A1 | 10/2009 | Evans et al. |
| 2009/0297257 A1 | 12/2009 | McMurtry |
| 2010/0058602 A1 | 3/2010 | McMurtry |
| 2011/0056074 A1 | 3/2011 | Jonas et al. |
| 2012/0323345 A1 | 12/2012 | Jonas et al. |
| 2015/0051862 A1 | 2/2015 | Jonas |
| 2015/0176956 A1 | 6/2015 | Pettersson et al. |
| 2015/0343631 A1 | 12/2015 | Martinez-Esponda |
| 2016/0223316 A1 | 8/2016 | Jordil et al. |
| 2016/0298959 A1 | 10/2016 | Jonas |
| 2017/0167659 A1 | 6/2017 | Hwang et al. |
| 2017/0363403 A1 | 12/2017 | Jonas |
| 2018/0209788 A1 | 7/2018 | McMurtry et al. |
| 2018/0299267 A1 | 10/2018 | Durand et al. |
| 2019/0145748 A1 | 5/2019 | Angood |
| 2020/0262055 A1 | 8/2020 | Angood |
| 2021/0010808 A1 | 1/2021 | McMurtry et al. |
| 2021/0033376 A1 | 2/2021 | Angood |
| 2021/0187729 A1 | 6/2021 | Angood |
| 2022/0307811 A1 | 9/2022 | Bulled |

FOREIGN PATENT DOCUMENTS

| | | |
|---|---|---|
| DE | 141061 A1 | 4/1980 |
| DE | 3504464 C1 | 4/1986 |
| DE | 19703735 C2 | 2/2002 |
| DE | 102004010826 A1 | 10/2004 |
| DE | 102009042014 A1 | 3/2011 |
| EP | 0834383 A1 | 4/1998 |
| EP | 1988357 A1 | 11/2008 |
| EP | 2705935 A1 | 3/2014 |
| EP | 2732934 A2 | 5/2014 |
| EP | 3054265 A1 | 8/2016 |
| EP | 3203179 A1 | 8/2017 |
| EP | 3 450 905 A1 | 3/2019 |
| GB | 2 568 459 A | 5/2019 |
| JP | H5-500337 A | 1/1993 |
| JP | 2003-534846 A | 11/2003 |
| JP | 2005-007489 A | 1/2005 |
| JP | 2008-275624 A | 11/2008 |
| JP | 2009-540315 A | 11/2009 |
| JP | 2011-529262 A | 12/2011 |
| JP | 2013-119135 A | 6/2013 |
| WO | 87-07711 A1 | 12/1987 |
| WO | 91/03145 A1 | 3/1991 |
| WO | 92/17313 A2 | 10/1992 |
| WO | 95/14905 A1 | 6/1995 |
| WO | 95/20747 A1 | 8/1995 |
| WO | 03/006837 A1 | 1/2003 |
| WO | 2004/063579 A1 | 7/2004 |
| WO | 2004/076132 A2 | 9/2004 |
| WO | 2007/144573 A1 | 12/2007 |
| WO | 2007/144585 A2 | 12/2007 |
| WO | 2007/144587 A1 | 12/2007 |
| WO | 2007/144602 A1 | 12/2007 |
| WO | 2007/144603 A2 | 12/2007 |
| WO | 2016-195176 A1 | 12/2016 |
| WO | 2017/021733 A1 | 2/2017 |
| WO | 2017/174966 A1 | 10/2017 |
| WO | 2019/073246 A1 | 4/2019 |

OTHER PUBLICATIONS

Jun. 26, 2020 Written Opinion issued in International Patent Application No. PCT/GB2020/050745.
Oct. 14, 2019 Search Report issued in UK Patent Application No. GB1905200.0.
U.S. Appl. No. 17/603,040, filed Oct. 12, 2021 in the name of ANGOOD.
Nov. 23, 2022 Notice of Allowance Issued in U.S. Appl. No. 17/603,040.
Dec. 7, 2018 Search Report issued in International Patent Application No. PCT/GB2018/05298.
Dec. 7, 2018 Written Opinion of Searching Authority issued in International Patent Application No. PCT/GB2018/05298.
Braddick H.J.J., "Mechanical Design of Laboratory Apparatus", Chapman & Hall, London, pp. 11-30, 1960.
Lahousse L., et al. "Application d'une nouvelle conception d'architecture à une machine de mesure de ré résolution nanométrique". Ecole Nationale Superieure des Arts et Metiers, Cedex, France, pp. 35-43, Apr. 2005.
Pandilov Z. et al., "Comparison of the Characteristics between Serial and Parallel Robots" Acta Tehnica Corviness, vol. VII, pp. 144-160, 2014.
Hale, Layton Carter. Thesis_v3: Hale Thesis (Principles and Techniques for Designing Precision Machines), Jan. 1999.

(56) References Cited

OTHER PUBLICATIONS

Corbel, David, etc al. "Optimal Design of a 6-dof Parallel Measurement Mechanism Integrated in a Parallel 3-dof Machine-Tool". IROS, Oct. 2008.

Exechon World. "What is a Parallel Kinematics Machine (PKM)". http://www.exechonworld.com/document/200804/article22.htm[Dec. 15, 2016 13:26:53], Apr. 5, 2008.

Corbel, David, et al. "Enhancing PKM Accuracy bySeparating Actuation and Measurement: A 3DOF Case Study". Journal of Mechanisms and Robotics, American Society of Mechanical Engineers, Dec. 6, 2010.

Aberlink, "EXALT the Qualities of new CMM at Control". Aberlink Innovative Metrology, <https://www.aberlink.com/news/aberlink-exalt-the-qualities-of-new-cmm-at-control.php.> Apr. 20, 2018.

Metrology News, "Portable Desktop CMM Set to Disrupt Small Part Dimensional Inspection Unveiled". <http://webcache.googleusercontent.com/search?q=cache:fjPBroXPMQEJ:metrology.news/desktop-robo-exalt-cmm-set-to-disrupt-small-part-inspection+&cd=13&hl=en&ct=clnk&gl=uk.> Apr. 17, 2018.

Mar. 27, 2018 Search Report issued in Great Britain Patent Application No. 1716793.3.

Dec. 9, 2020 Notice of Allowance issued in U.S. Appl. No. 16/649,065.

\* cited by examiner

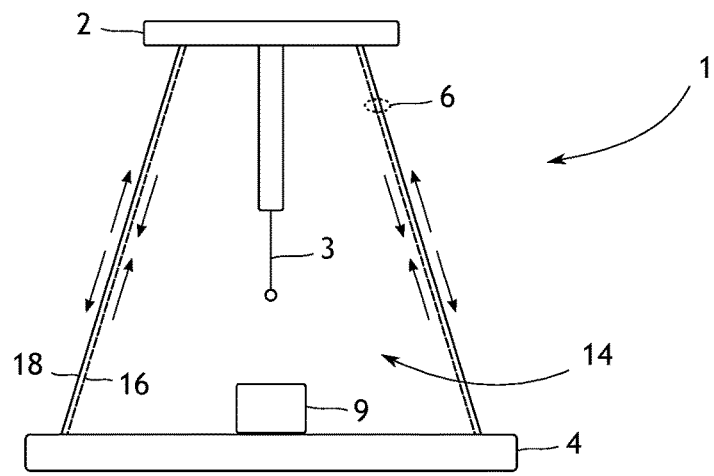
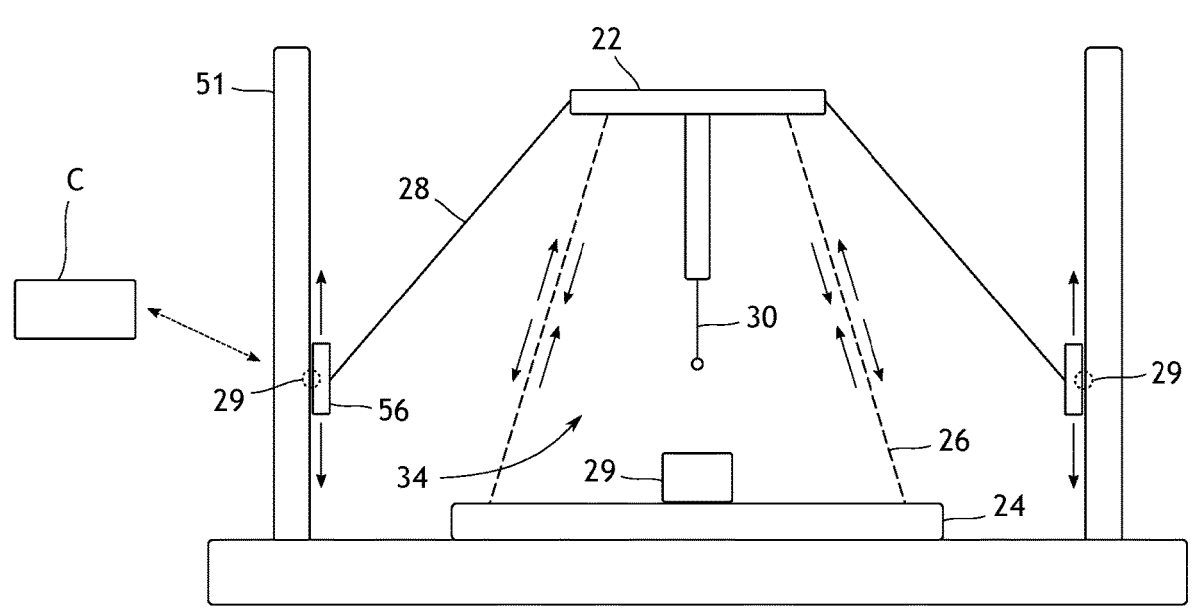

COORDINATE POSITIONING MACHINE

RELATED APPLICATIONS

This is a Continuation of application Ser. No. 16/649,065 filed Mar. 19, 2020, which is a National Stage Application of PCT/GB2018/052928 filed Oct. 12, 2018, which in turn claims priority to British Application No. 1716793.3 filed Oct. 13, 2017. The entire disclosures of the prior applications are hereby incorporated by reference herein in their entirety.

BACKGROUND OF THE INVENTION

1. Field of the Invention

The present invention relates to a coordinate positioning machine. Coordinate positioning machines include, for example, coordinate measuring machines (CMMs) and machine tools.

2. Description of the Related Art

A non-Cartesian coordinate positioning machine 1 is illustrated schematically in FIG. 1 of the accompanying drawings. The coordinate positioning machine 1 generally comprises first and second structures 2, 4 that are supported and moved relative to each other by a plurality of telescopic or extendable legs 6 provided between them. The first and second structures 2, 4 are sometimes referred to as platforms or stages, and the extendable legs 6 are sometimes referred to as struts or rams. Where there are six such extendable legs 6 (as illustrated in FIG. 1), the machine is commonly called a hexapod.

The extendable legs 6 are typically mounted on the structures 2, 4 via ball joints 8, with each leg 6 either having its own ball joint 8 at one or both ends thereof (as illustrated in FIG. 1), or sharing a ball joint 8 with an adjacent leg 6 at one or both ends. Each extendible leg 6 is typically formed as a pair of tubes, with one tube being moved telescopically within the other by a drive mechanism (e.g. motor) in order to provide extension and retraction of the extendible leg 6.

Various relative positions between the first and second structures 2, 4 can be achieved by extending the legs 6 by differing amounts, as illustrated in FIG. 1 by arrows 13. The relative position at any instant is monitored by a plurality of length-measuring transducers 10, for example with one transducer being associated with each extendable leg 6. Each length-measuring transducer 10 may comprise an encoder scale paired with a readhead, with the encoder scale being mounted suitably to one of the pair of telescopic tubes and the readhead mounted suitably on the other. Extension of the leg 6 thus causes the encoder scale to move past the readhead thereby allowing the length of the extendible leg 6 to be measured. A computer controller 5 operates to set the length of each extendable leg 6 to provide the required relative movement between the structures 2, 4. By having six such length-measuring transducers 10, the relative position can be measured in six corresponding respective degrees of freedom (three translational degrees of freedom and three rotational degrees of freedom).

One of the structures 2, 4 is typically provided as part of a fixed structure of the coordinate positioning machine 1, with the other of the structures 4, 2 moving 12, 11 relative to the fixed structure. A tool (for example a measurement probe or a drill) can be mounted on the moving structure and a workpiece mounted on the fixed structure, or vice versa, to enable an operation to be performed on the workpiece (for example measuring, probing, or scanning in the case of a coordinate measuring machine, or machining in the case of a machine tool).

For example, as illustrated in FIG. 1, the lower structure 4 is fixed and the upper structure 2 is moveable, with a workpiece 9 mounted on the lower structure 4 and a probe component 3 mounted on the upper structure 2. A working volume 14 is defined between the upper structure 2 and the lower structure 4 when at their most spaced-apart positions, with the probe component 3 being positioned in the working volume 14 by operation of the extendible legs 6. Although arrows 11 are shown to indicate translational movement, with appropriate control of the various legs 6 the structure 2 could also be tiltable.

Alternatively, the upper structure 2 could be fixed and the lower structure 4 moveable, with a probe mounted to a lower surface of the lower structure 4 and a workpiece mounted to a part of the fixed structure below that, so that the working volume (or operating volume) of the machine is below the lower structure 4 rather than above it.

Various types of non-Cartesian coordinate positioning machine are described in more detail in WO 91/03145, WO 95/14905, WO 95/20747, WO 92/17313, WO 03/006837, WO 2004/063579, WO 2007/144603, WO 2007/144573, WO 2007/144585, WO 2007/144602 and WO 2007/144587.

For example, WO 91/03145 describes a hexapod machine tool comprising an upper, moveable, structure that is attached to a base by six hydraulic extendable legs, similar in principle to that illustrated in FIG. 1 described above. The extendable legs are attached to the base and moveable structure via ball joints. The extendable legs are hydraulic and comprise a piston rod that is moveable within a cylinder. The amount of leg extension is measured by mounting a magnetic scale to the cylinder and a suitable readhead on the piston rod. Extension of the leg thus causes the scale to move past the readhead thereby allowing the length of the leg to be measured. A computer controller operates to set the length of each leg to provide the required movement.

EP3054265A1 discloses the use of a delta robot to move an end effector, and an imaging detector to capture image data of at least part of the end effector. From the captured image data, and in particular from reference points on the end effector, the position of the end effector can be determined by photogrammetry.

DE3504464C1 describes the use of a hexapod arrangement of measurement struts to calibrate a robot arm. US 2008/0271332 describes the use of a hexapod arrangement of measurement struts in series with a Cartesian coordinate measuring machine.

SUMMARY OF THE INVENTION

According to an embodiment of one aspect of the present invention, there is provided a coordinate positioning machine comprising a structure moveable within a working volume of the machine, a drive arrangement for moving the structure around the working volume in fewer than six degrees of freedom, and a metrology arrangement for measuring the position of the structure within the working volume in more degrees of freedom than the drive arrangement.

According to an embodiment of another aspect of the present invention, there is provided a coordinate positioning machine comprising a structure moveable within a working volume of the machine, a metrology arrangement for measuring the position of the structure within the working volume, and a drive arrangement for moving the structure around the working volume, wherein the metrology arrangement comprises a plurality of measurement transducers in a parallel arrangement for providing a corresponding respective plurality of measurements from which the position of the moveable structure is determinable, wherein the drive arrangement comprises a plurality of mechanical linkages arranged in parallel between the moveable structure and a fixed structure of the machine, and wherein each mechanical linkage is actuated by a drive mechanism which acts between the fixed structure and the mechanical linkage.

According to an embodiment of another aspect of the present invention, there is provided a coordinate positioning machine comprising a structure moveable within a working volume of the machine, a metrology arrangement for measuring the position of the structure within the working volume, and a drive arrangement for moving the structure around the working volume, wherein the metrology arrangement comprises a plurality of measurement transducers in a parallel arrangement for providing a corresponding respective plurality of measurements from which the position of the moveable structure is determinable, and wherein the drive arrangement comprises a plurality of actuators in a parallel arrangement of a different type to that of the metrology arrangement. For example, the parallel actuator arrangement may be a tri-glide type of arrangement or a cable robot type of arrangement, while the parallel measurement transducer arrangement may be a hexapod type of arrangement. According to an embodiment of another aspect of the present invention, there is provided a coordinate positioning machine comprising a structure moveable within a working volume of the machine, a drive arrangement for moving the structure around the working volume in fewer than six degrees of freedom, and a metrology arrangement for measuring the position of the structure within the working volume in more degrees of freedom than the drive arrangement, wherein the metrology arrangement is a mechanical metrology arrangement.

According to an embodiment of another aspect of the present invention, there is provided a coordinate positioning machine comprising a structure moveable within a working volume of the machine, a hexapod metrology arrangement for measuring the position of the structure within the working volume, and a non-hexapod drive arrangement for moving the structure around the working volume. The moveable structure may be adapted to carry an operational tool with the metrology and drive arrangements also coupled to the moveable structure.

The metrology arrangement may comprise a plurality of measurement transducers in a parallel arrangement for providing a corresponding respective plurality of measurements from which the position of the moveable structure is determinable.

The measurement transducers may be length-measuring transducers.

The measurements may relate to different respective separations between the moveable structure and a fixed structure of the machine.

The measurement transducers may be adapted to provide direct measurements of the separations.

The measurement transducers may be adapted to provide direct measurements of changes in the separations as the structure moves around the working volume, from which changes the separations are determinable.

Each of the measurement transducers may comprise an encoder scale and associated readhead.

The metrology arrangement may comprise a plurality of extendable legs arranged in parallel, with the extendable legs corresponding in number to the number of measurement transducers and with each of the plurality of measurement transducers being associated with a different respective one of the plurality of extendable legs.

The coordinate positioning machine may comprise six such measurement transducers.

The plurality of measurement transducers may be a plurality of independent measurement transducers.

The plurality of measurement transducers described herein is to be contrasted with an image-based or photogrammetric metrology arrangement, for example, in which each image capture device does not make a direct or independent measurement of any length or separation, or of the position of at least part of the moveable structure; a determination of the position of the moveable structure can only take place based on a photogrammetric combination of images from all of the image capture devices. With an image-based or photogrammetric metrology arrangement, distances can only be inferred indirectly from image data.

The drive arrangement may be adapted to maintain the moveable structure at a substantially constant orientation as it moves around the working volume.

The drive arrangement may comprise a plurality of mechanical linkages connected in parallel between the moveable structure and a fixed structure of the machine.

Each mechanical linkage may be actuated (or driven) by a drive mechanism which acts between the fixed structure and the mechanical linkage. A distinction is to be drawn here between such a drive mechanism and one that acts for example between two parts (or links) of the mechanical linkage. For example, with a typical hexapod drive arrangement, the motor for each extendable leg would act between the two parts of the extendable leg, pushing the two parts away from one another to extend the leg and doing the opposite to retract the leg. The motor does not act between the extendable leg (the mechanical linkage) and the fixed structure. As such, it can be considered that, in an embodiment of the present invention, each mechanical linkage may be actuated (or driven) by a drive mechanism which acts directly between the fixed structure and the mechanical linkage.

Movement of a driven part of the mechanical linkage may be caused by the drive mechanism associated with that mechanical linkage rather than by one or more other drive mechanisms associated with other mechanical linkages of the drive arrangement.

The driven part of the mechanical linkage may be a carriage that is arranged to move linearly along a corresponding track. A plurality of such tracks may be arranged substantially parallel with one another. Three such tracks are provided in the case of a tri-glide drive arrangement.

The drive mechanism may be a rotary drive mechanism, such as is found in a delta robot.

Such a drive mechanism may be arranged to drive a driven part of the mechanical linkage in a substantially rotary manner relative to the fixed structure.

The rotary drive mechanism may be a direct rotary drive mechanism.

The drive mechanism may be a linear drive mechanism, such as is found in a tri-glide arrangement or a cable robot.

Such a drive mechanism may be arranged to drive a driven part of the mechanical linkage in a substantially linear manner relative to the fixed structure, such as along a substantially linear manner feature of the fixed structure, such as along a substantially linear track of the fixed structure.

The linear drive mechanism may be a direct linear drive mechanism.

The linear drive mechanism may be arranged to translate the end of the mechanical linkage in a substantially linear manner.

The linear drive mechanism may comprise a linear motor.

Each mechanical linkage may comprise at least two substantially parallel rods to maintain the moveable structure at a substantially constant orientation as it moves around the working volume.

The drive arrangement may comprise three such mechanical linkages.

The drive arrangement may be a tri-glide arrangement.

The metrology arrangement may comprise a plurality of mechanical linkages arranged in parallel between the fixed structure and the moveable structure, with a corresponding plurality of measurement transducers associated respectively with the plurality of mechanical linkages. There may be six such mechanical linkages of the metrology arrangement and six corresponding respective measurement transducers.

Each mechanical linkage of the metrology arrangement may be connected between points on the fixed structure and the moveable structure respectively and may be adapted to allow a separation between those points to be varied.

The measurement transducer associated with the mechanical linkage of the metrology arrangement may be adapted to provide an output that is dependent on the separation.

Each mechanical linkage of the metrology arrangement may be an extendable or extending leg.

A mechanical linkage may also be referred to or considered to be a kinematic chain or a mechanical assembly.

A drive mechanism may be provided separately for each mechanical linkage of the drive arrangement.

The drive mechanism associated with a mechanical linkage may be arranged to act between the fixed structure and an end of the mechanical linkage.

Each mechanical linkage may comprise at least one rigid rod.

Each mechanical linkage may comprise at least two substantially parallel rods to maintain the moveable structure at a substantially constant orientation as it moves around the working volume.

Each of the mechanical linkages may be of substantially the same arrangement or design.

A drive arrangement having three mechanical linkages each with a linear drive mechanism is known as a tri-glide arrangement.

The drive arrangement may comprise or be in the form of or provide a delta robot arrangement.

The drive arrangement may comprise or be in the form of or provide a linear delta robot arrangement.

The drive arrangement may be adapted to move the structure around the working volume in fewer than six degrees of freedom, and the metrology arrangement may be adapted to measure the position of the structure within the working volume in more degrees of freedom than the drive arrangement.

The metrology arrangement may be a hexapod metrology arrangement.

The drive arrangement may be a non-hexapod drive arrangement.

The drive arrangement may be adapted to move the structure around the working volume in three degrees of freedom.

The three degrees of freedom may be three translational degrees of freedom.

The metrology arrangement may be adapted to measure the position of the structure in six degrees of freedom (three translational degrees of freedom and three rotational degrees of freedom, i.e. position and orientation).

The metrology arrangement and drive arrangement may each be arranged between (e.g. connected to) the moveable structure and a fixed structure of the machine.

The metrology arrangement and drive arrangement may each be connected or coupled to both the moveable structure and the fixed structure.

The drive arrangement may comprise a plurality of actuators in a parallel arrangement. This is to be contrasted with a serial arrangement of actuators that is present, for example, in a traditional three-axis (x, y, z) coordinate measuring machine (CMM).

The drive arrangement may comprise a plurality of actuators in a parallel arrangement of a different type to that of the metrology arrangement.

The drive arrangement may comprise a plurality of measurement transducers, separate to those of the metrology arrangement, for providing corresponding respective measurements from which the position of the moveable structure is determinable independently of the position determined based on the measurements from the metrology arrangement. In other words, the drive arrangement may be encoded independently of the metrology arrangement.

The drive arrangement may be coupled to the metrology arrangement via a coupling arrangement which prevents at least some distortion associated with the drive arrangement from being transferred to the metrology arrangement.

The coupling arrangement may be a kinematic or pseudo-kinematic coupling arrangement.

The coupling arrangement may comprise a plurality of balls.

The coupling arrangement may comprise a plurality of resilient spacers or pads.

The moveable structure may comprise a drive part associated with the drive arrangement and a metrology part associated with the metrology arrangement, with the drive part of the moveable structure being coupled to the metrology part of the moveable structure via the coupling arrangement.

The drive part of the moveable structure may be coupled to the drive arrangement.

The metrology part of the moveable structure may be coupled to the metrology arrangement.

The coordinate positioning machine may comprise a fixed structure having a drive part associated with the drive arrangement and a metrology part associated with the metrology arrangement, with the drive part of the fixed structure being coupled to the metrology part of the fixed structure via the coupling arrangement.

The drive part of the fixed structure may be coupled to the drive arrangement.

The metrology part of the fixed structure may be coupled to the metrology arrangement.

The moveable structure may carry an operational tool. In other words, the operational tool may be carried by the moveable structure at the same time as the metrology arrangement is coupled to the moveable structure. The coordinate measuring machine in such a configuration is ready for operational use (with a working tool in place), rather than e.g. merely ready to be calibrated (where there would be no working tool in place).

The machine may be a coordinate measuring machine.

The machine may be a comparator.

The operational tool may be a surface sensing device or measurement probe.

The machine may be a machine tool.

The operational tool may be a mechanical tool for shaping or machining materials.

The metrology arrangement may comprise measurement transducers arranged exclusively in parallel with one another, i.e. without any measurement transducers arranged in series with one another.

The metrology arrangement may comprise six measurement transducers in a parallel arrangement for providing six corresponding respective measurements from which the position of the moveable structure is determinable. A metrology arrangement having fewer than six measurement transducers in a parallel arrangement is not a hexapod metrology arrangement (e.g. a tripod is not a hexapod).

The metrology arrangement can be considered to be for measuring different positions of the moveable structure within the working volume resulting from different respective states or configurations of the drive arrangement. In other words, the metrology arrangement measures the position (a first position) of the moveable structure in a first configuration of the drive arrangement, the drive arrangement then moves into a second configuration different to the first, and the metrology arrangement measures the position (a second position) of the moveable structure in the second configuration of the drive arrangement. The drive arrangement can be considered to include all parts of the machine used to move the moveable structure from the first position to the second position.

The metrology arrangement may comprise six extendable legs arranged in parallel, with the six measurement transducers being associated respectively with the six extendable legs.

The measurement transducers may be interferometric measurement transducers.

The drive arrangement may comprise fewer than six actuators in a parallel arrangement.

The drive arrangement may be a parallel kinematic arrangement.

The drive arrangement may be a non-Cartesian arrangement.

The drive arrangement may comprise fewer than six actuators.

The parallel arrangement of actuators associated with the drive arrangement may be different to the parallel arrangement of measurement transducers associated with the metrology arrangement.

The drive arrangement may comprise a plurality of measurement transducers for providing corresponding respective measurements from which the position of the moveable structure is determinable.

The measurement transducers may be mechanical measurement transducers as opposed to optical or image-based or photogrammetric measurement transducers.

The measurement transducers may be length-measuring transducers. Measuring a length of a part of a machine, such as an extendible leg, may be considered to be equivalent to measuring a separation between two parts of the machine, such as the ends of the extendable leg. A transducer may not measure an absolute length or separation, but may measure a change in length or separation, from which the absolute length or separation can be determined (for example based on a geometric model of the machine). Examples of sensors that do not measure length, but which can be used e.g. in combination with other sensor data to determine position, are accelerometers (acceleration sensors), tilt sensors and gyroscopes.

The measurement transducers may be sampled at a first clock rate that is comparable to (e.g. at least half that of, or at least that of, or substantially the same as) a second clock rate used to control the drive arrangement.

The measurements received from the measurement transducers may allow the position of the structure to be determined without reference to other sensor or transducer data (such as photogrammetric data from an image sensor) that may be obtained at a third clock rate lower than the first clock rate.

The first clock rate may be higher than 1 kHz, more preferably higher than 10 kHz, more preferably higher than 15 kHz.

The metrology arrangement may be coupled to the moveable structure in a non-contactless manner, such as optically where the metrology arrangement is an optical metrology arrangement.

The metrology arrangement may be coupled mechanically to the moveable structure, such as where the metrology arrangement is a hexapod metrology arrangement.

The metrology arrangement may be a mechanical metrology arrangement, for example as opposed to an optical or image-based or photogrammetric metrology arrangement.

The metrology arrangement may be coupled mechanically to the moveable structure.

An extendable leg may comprise any mechanical arrangement (e.g. mechanical linkage) that allows the separation between a point on the fixed structure and a point on the moveable structure to be varied.

The moveable structure may be adapted to support or carry an object that is to be moved around the working volume. The object may be one that is to be picked up and/or placed within the working volume. The object may be a tool for interacting with or operating on another object, such as a workpiece, located in the working volume. The tool may be a surface sensing device. The surface sensing device may be a measurement probe. The measurement probe may be a contact probe. The contact probe may comprise a stylus which makes physical contact in use with a workpiece surface to take a measurement. The measurement probe may be a non-contact probe. The non-contact probe may be an optical probe. The tool may comprise a camera for imaging the surface of a workpiece. The tool may be a mechanical tool that is typically found in a machine tool for shaping or machining metal or other rigid materials.

The movable structure may be adapted to carry an operational tool with the metrology and drive arrangements also coupled to moveable structure. The coordinate positioning machine may be set up with the operational tool already coupled to the moveable structure and ready to perform the operation for which it is intended. In other words, the coordinate positioning machine may be set up for operation rather than merely for calibration.

The hexapod metrology arrangement may be coupled to the moveable structure via a different attachment than that used for attaching the operational tool to the moveable structure.

The hexapod metrology arrangement may be coupled directly to the moveable structure.

A "transducer" can be considered herein to be a device that either converts variations in a physical quantity into an electrical signal (a "sensor", such as the measurement transducers described herein that measure or sense changes in length), or vice versa from an electrical signal to a physical quantity (an "actuator", such as the motors and associated drive linkages described herein that provide movement to the structure based on an input or drive signal).

Measuring the "position" of the structure is to be understood as measuring the position and/or orientation of the structure, to the appropriate number of degrees of freedom. For example, where position is measured in six degrees of freedom then both the position and orientation of the structure are determined. However, if the position is only measured in three degrees of freedom then this may or may not include a determination of the orientation of the structure. The term "measuring the position" is to be interpreted accordingly.

According to an embodiment of another aspect of the present invention, there is provided a method of controlling a coordinate positioning machine according to any of the above-described aspects, the method comprising: coupling a tool to the moveable structure, using the drive arrangement to move the tool around the working volume with the metrology arrangement also coupled to the moveable structure, and performing an operation with the tool.

The method may comprise using the metrology arrangement to determine the position of the tool within the working volume for the operation.

The method may comprise associating the determined position with the performed operation.

The operation may be a measurement operation. The operation may be a machining operation.

The tool may be a measurement probe and the operation may be a measurement operation such as taking a touch trigger measurement of a workpiece located in the working volume.

The method may be carried out based on the position of the structure rather than the tool, or a combination thereof.

According to an embodiment of another aspect of the present invention, there is provided a controller for a coordinate positioning machine, wherein the controller is configured to perform a method as described above.

According to an embodiment of another aspect of the present invention, there is provided a computer program which, when run by a coordinate positioning machine controller, causes the controller to perform a method as described above, or which, when loaded into a coordinate positioning machine controller, causes the coordinate positioning machine controller to become a coordinate positioning machine controller as described above. The program may be carried on a carrier medium. The carrier medium may be a storage medium. The carrier medium may be a transmission medium.

According to an embodiment of another aspect of the present invention, there is provided a computer-readable medium having stored therein computer program instructions for controlling a coordinate positioning machine controller to perform a method as described above.

BRIEF DESCRIPTION OF THE DRAWINGS

FIG. 2 is a schematic side view of the hexapod coordinate positioning machine of FIG. 1;

FIG. 3 is a schematic side view of a coordinate positioning machine embodying the present invention having a metrology arrangement and a separate drive arrangement;

DETAILED DESCRIPTION OF THE PREFERRED EMBODIMENTS

Figure 1:
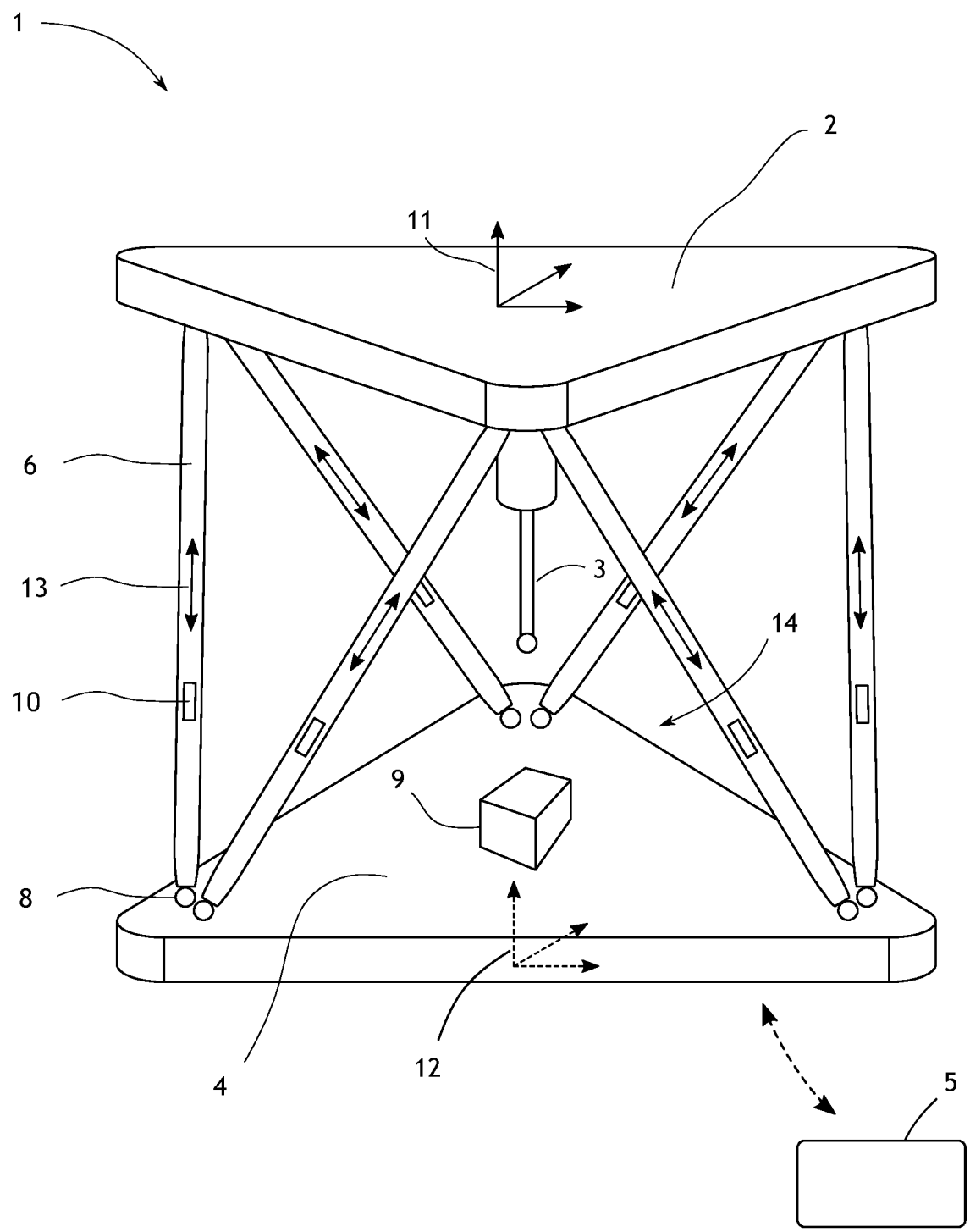
FIG. 1, discussed hereinbefore, is schematic illustration of a hexapod coordinate positioning machine, having six extendable legs.

A side view of the coordinate positioning machine 1 discussed above with reference to FIG. 1 is illustrated schematically in FIG. 2. The coordinate positioning machine 1 comprises an upper structure 2 that is moveable within a working volume 14 of the machine 1. The six extendable legs 6 form both a hexapod drive arrangement 18 (shown in solid line) for moving the upper structure 2 around the working volume 14, and also a hexapod metrology arrangement 16 (shown in dotted line) for measuring the position of the upper structure 2 within the working volume 14. The coordinate positioning machine 1 therefore has combined drive and metrology struts.

By way of comparison, a coordinate positioning machine 21 according to an embodiment of the present invention is illustrated schematically in FIG. 3. Like the FIG. 2 machine, the coordinate positioning machine 21 comprises an upper structure 22 that is moveable within a working volume 34 of the machine 21, a drive arrangement 28 (shown in solid line) for moving the upper structure 22 around the working volume 34, and a metrology arrangement 26 (shown in dotted line) for measuring the position of the moveable upper structure 22 within the working volume 34.

Whilst in the coordinate positioning machine 1 illustrated in FIG. 2 the hexapod metrology arrangement 16 and the hexapod drive arrangement 18 are combined, in the coordinate positioning machine 21 embodying the present invention as shown in FIG. 3, the drive arrangement 28 is different to and separate from the metrology arrangement 26. A technical advantage is achieved by separating the metrology arrangement 26 from the drive arrangement 28 in this way, because it allows these two different arrangements to be designed with very different (and sometimes conflicting) technical considerations in mind.

Separating and differentiating the metrology arrangement 26 from the drive arrangement 28 allows the drive arrangement 28 to be made relatively light-weight and fast, so that the structure 22 can be moved around the working volume 34 quickly with high accelerations and rapid changes of direction. Whilst focussing on factors like weight and speed may sacrifice some degree of positional accuracy in the drive arrangement 28, this is overcome by providing a metrology arrangement 26 that is instead designed with positional accuracy in mind.

Because the metrology arrangement 26 is passive and has no need for any drive components, which add weight and generate heat, metrology errors caused by inertial and thermal distortion of parts (including the measurement scale used to measure distance) can thereby be controlled and reduced.

Use of a metrology arrangement 26 that is separate from and different to the drive arrangement 28 provides a coordinate positioning machine 21 in which the moveable structure can be driven quickly around the working volume, yet retaining the accuracy required of demanding positioning applications.

With such a design, it also becomes possible to choose a relatively inexpensive off-the-shelf drive mechanism for the drive arrangement 28, not designed particularly with high accuracy in mind, knowing that it will be coupled by a dedicated metrology arrangement 26 to provide the required accuracy, and this therefore allows production costs to be lowered.

Mechanical metrology arrangements also benefit from having low-friction joints, while drive arrangements typically require more robust and substantial joints that inevitably have a higher degree of friction, particularly when under load, so there is a design conflict that is overcome by separating the metrology arrangement 26 from the drive arrangement 28. The joints of the metrology arrangement 26 can be of a lower-friction type and will also not be under the same loads as the drive arrangement 28. Hysteresis effects, which can lead to different measurements being recorded depending on the direction in which the workpiece is approached, can accordingly be reduced by separation of the metrology arrangement 26 from the drive arrangement 28.

In the coordinate positioning machine 21 of FIG. 3, the metrology arrangement 26 is a hexapod arrangement, while the drive arrangement 28 is a non-hexapod arrangement (i.e. something other than or different to a hexapod arrangement). Use of a hexapod-based metrology arrangement 26 is particularly beneficial because a hexapod provides a robust mechanical system having a parallel arrangement of measurement transducers that provide direct measurements of distance from which a very accurate and reliable determination of position in six degrees of freedom can be derived.

A hexapod-based metrology arrangement 26 also has advantages over some image-based metrology arrangements in terms of the rate at which the position of the moving structure 22 can be determined or sampled. For image-based (photogrammetric) metrology arrangements, the sampling rate is inherently limited by the sampling rate of the image sensor, and further limited by the time take to perform complex calculations based on the large amount of image information in order to derive the position of the moving platform. For example, with the image-based system of EP3054265A1 it is stated that "the frame rate supplied by the imaging detectors usually is only up to a few hundred hertz"; this is described as being a benefit because it avoids detecting unwanted high frequency movements, like vibrations.

However, the present applicant has appreciated that a far higher dynamic bandwidth can be achieved by direct sampling of data from measurement transducers associated with the extendable legs of a hexapod metrology arrangement. For example, a machine controller may typically request position data from an absolute encoder every 65 µs (15 kHz), but higher sampling rates are also possible. Incremental encoder systems produce a continuous sinusoidal output which allows finer motion control still, limited only by the rate at which the continuous output can be sampled. Unlike image-based systems, the calculations required to determine the position of the moveable structure from these values are not overly time consuming.

It is also noted that the image-based system of EP3054265A1 does not describe the use of a parallel arrangement of measurement transducers that independently provide a corresponding set of measurements, with each measurement of the set directly representing or relating to a distance or separation between a different point on the moving platform and a point on the fixed structure, and from which the position and/or orientation of the moving platform may be determined. In particular, EP3054265A1 does not describe the use of a hexapod metrology arrangement.

With a hexapod drive arrangement such as that illustrated in FIG. 1, each of the six struts requires a motor that must necessarily form part of the associated strut, i.e. that moves with the strut. Therefore, when the hexapod is actuated to move the moveable structure around the working volume, the weight of the relatively heavy motor parts is also being moved around. Having to move this extra mass around reduces the potential speed (or acceleration) of the drive arrangement, and creates additional heat in the machine which has a negative effect when it reaches the metrology arrangement. By providing a non-hexapod drive arrangement such as that illustrated in FIG. 3, these problems can be overcome, because it allows the motor parts to be moved off the moving parts.

Furthermore, by using a non-hexapod drive arrangement that provides movement to the moveable structure 22 in fewer than six degrees of freedom, fewer actuators are required (i.e. fewer than the six actuators required in a hexapod), reducing cost and complexity and also reducing the amount of heat generated, due to the fewer number of heat-generating motor parts, and therefore improving metrology results.

The hexapod metrology arrangement 26 of FIG. 3 is generally similar to the hexapod arrangement of FIGS. 1 and 2, but without any actuation or motor components that are required to provide drive. The drive arrangement 28 in this embodiment is a so-called "tri-glide" arrangement, for example as disclosed in US 2003/0005786, having three carriages 56 moving along three corresponding respective linear tracks 51 arranged substantially in parallel. These arrangements will be described in more detail below with reference to FIGS. 5 to 8.

Referring again to FIG. 3, the coordinate positioning machine 21 comprises a lower structure 24 that forms part of the fixed structure of the machine 21, with a workpiece 29 mounted on the lower structure 24. A measurement probe 30 is supported on the upper structure 22 so that it can be moved around the working volume 34. The working volume 34 is defined between the upper structure 22 and the lower structure 24 when at their most spaced-apart positions, with the probe component 30 being positioned in the working volume 34 by operation of the drive arrangement 28.

Also illustrated schematically in FIG. 3 is a controller C for controlling the drive arrangement 28 to cause the desired movement of the structure 22; the controller C can be implemented in hardware or software or a combination thereof. Purely for the sake of clarity and brevity, the controller C is omitted from subsequent drawings.

Figure 4:
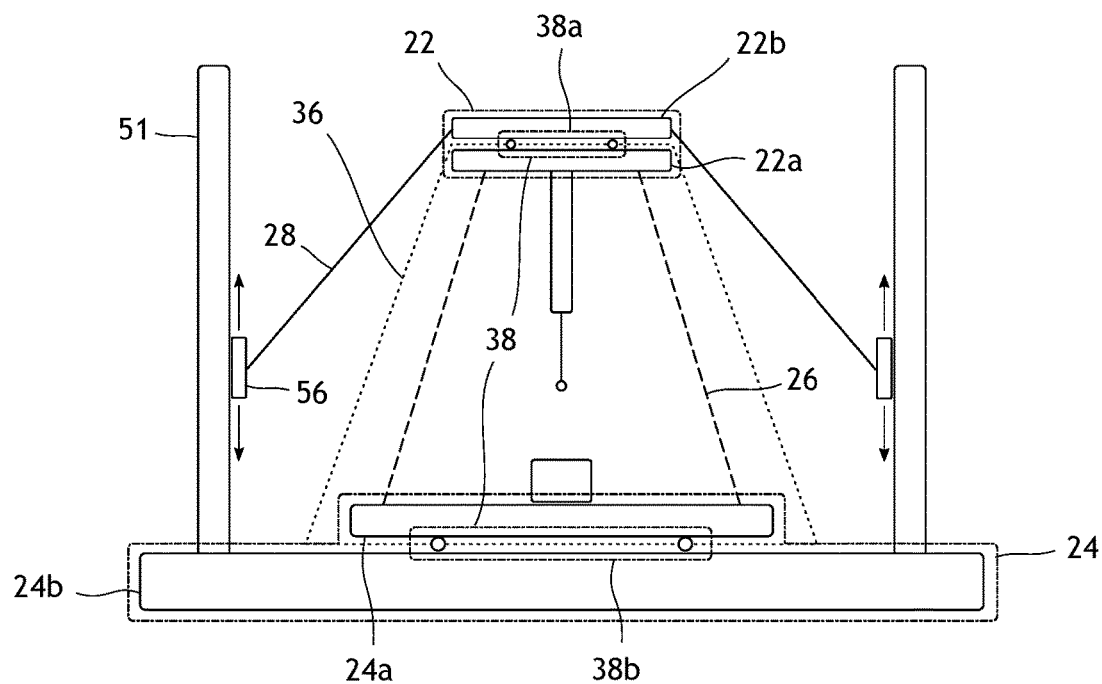
FIG. 4 is a schematic side view of a coordinate positioning machine embodying the present invention in which the metrology arrangement is decoupled to some extent from the drive arrangement.

As illustrated in FIG. 4, to provide even further separation between the drive arrangement 28 and the metrology arrangement 26, the drive arrangement 28 may be coupled to the metrology arrangement 26 via a coupling arrangement 38 which prevents at least some distortion associated with the drive arrangement 28 from being transferred to the metrology arrangement 26. The coupling arrangement 38 comprises a first coupling 38a associated with the moveable structure 22 and a second coupling 38b associated with the fixed structure 24.

In the schematic embodiment illustrated in FIG. 4, the moveable structure 22 comprises a metrology part 22a associated with the metrology arrangement 26 and a drive part 22b associated with the drive arrangement 28, with the metrology part 22a of the moveable structure 22 being coupled to the drive part 22b of the moveable structure 22 via the first coupling 38a. The metrology part 22a of the moveable structure 22 is coupled to the metrology arrangement 26. The drive part 22b of the moveable structure 22 is coupled to the drive arrangement 28.

Similarly, the fixed structure 24 comprises a metrology part 24a associated with the metrology arrangement 26 and a drive part 24b associated with the drive arrangement 28, with the metrology part 24a of the fixed structure 24 being coupled to the drive part 24b of the fixed structure 24 via the second coupling 38b. The metrology part 24a of the fixed structure 24 is coupled to the metrology arrangement 26. The drive part 24b of the fixed structure 24 is coupled to the drive arrangement 28.

In this example, each coupling 38a, 38b of the coupling arrangement 38 is in the form of a kinematic or pseudo-kinematic coupling. In the context of locating a body relative to another, kinematic design considerations are met by constraining the degrees of freedom of motion of the body using the minimum number of constraints, and in particular involves avoiding over constraining. Over constraining can result in multiple points of contact between two bodies enabling one body to rest in more than one position against the other. Accordingly, the body's location is not repeatable as it is not known at which of the several positions the body will come to rest. In particular, where there is over constraint, there is a conflict between the constraints that are in place, so that it is not possible to determine with any certainty which combination of constraints will determine the actual position of the body. These concepts are described in H. J. J. Braddick, "Mechanical Design of Laboratory Apparatus", Chapman & Hall, London, 1960, pages 11-30.

Such a kinematic coupling, with the minimum number of contact points (or point-like contacts) to provide ideal constraint, is also very effective at isolating distortions in one half of the coupling being transferred to the other half of the coupling. Thus, the first coupling 38a helps to prevent distortions of the drive part 22b of the moveable structure 22 (resulting from forces acting on that part from the drive arrangement 28) being transferred to the metrology part 22a (and thereby to the metrology arrangement 26), and similarly for the second coupling 38b in respect of the fixed structure 24. This provides a clearly-delineated metrology frame 36 that has a good degree of mechanical isolation from the drive arrangement 28.

In particular, in this embodiment each coupling 38a, 38b comprises a set of three balls to provide three points of contact according to kinematic design principles (only two are shown in the schematic illustration of FIG. 4). It is also of benefit to use a plurality of resilient spacers or pads instead of rigid balls, e.g. three such spacers arranged at the corners of a triangle. This provides some degree of kinematic coupling, even if the contact is not point-like but instead spread over the small area of the resilient spacer. Use of resilient spacers (e.g. made of rubber) is beneficial since they act to absorb some vibration from the drive arrangement 28 so that it is not transferred to the metrology arrangement 26.

It will also be appreciated that such a coupling can be provided at both ends (i.e. in association with the moveable structure 22 and the fixed structure 24), or at one end only (i.e. in association with only one of the moveable structure 22 and the fixed structure 24), or not at all (i.e. at neither of the moveable structure 22 and the fixed structure 24).

An embodiment will now be described in more detail with reference to FIGS. 5 to 8, which show more detailed representations of the machine structure than the very schematic illustrations of FIGS. 3 and 4.

The hexapod metrology arrangement 26 illustrated in FIGS. 5 to 8 comprises six extendable legs 60, generally of the same construction, arranged between the upper structure 22 and the lower structure 24. As per FIG. 4, the upper structure 22 comprises a metrology part 22a associated with the metrology arrangement 26 and a drive part 22b associated with the drive arrangement 28, with the metrology part 22a of the moveable structure 22 being coupled to the drive part 22b of the moveable structure 22 via the first coupling 38a. The metrology part 22a of the moveable structure 22 is coupled to the metrology arrangement 26 via ball joints 68. The drive part 22b of the moveable structure 22 is coupled to the drive arrangement 28 via ball joints 58.

Similarly, the fixed structure 24 comprises a metrology part 24a associated with the metrology arrangement 26 and a drive part 24b associated with the drive arrangement 28, with the metrology part 24a of the fixed structure 24 being coupled to the drive part 24b of the fixed structure 24 via the second coupling 38b. The metrology part 24a of the fixed structure 24 is coupled to the metrology arrangement 26. The drive part 24b of the fixed structure 24 is coupled to the drive arrangement 28.

Each of the six extendable legs 60 comprises an upper tube 64 and a lower tube 62, with the lower tube 62 sliding telescopically within the upper tube 64. The extendable legs 60 are generally of a similar construction to those described in WO 2017/021733 and application no. PCT/GB2017/050909, except that there is no need in this embodiment for the extendable legs to be driven, and therefore no need for any motor-related components. However, the overall construction of the extendable legs 60 is generally similar.

With the example illustrated in FIGS. 5 to 8, the lower structure 24 is fixed and the upper structure 22 is moveable relative to the lower structure 24 by operation of the six extendable legs 60, with a measurement probe 30 being mounted to a lower surface of the upper structure 22. In this configuration, a workpiece (not illustrated in FIGS. 5 to 8) would be mounted on top of the metrology part 24a of the lower structure 24, so that the working volume of the machine 21 is between the metrology parts 22a, 24a of the upper and lower structures 22, 24 respectively. The measurement probe 30 comprises a stylus with a workpiece-contacting tip, with the measurement probe 30 being connected to the metrology part 22a of the moving structure 22 via a quill 32.

The extendable legs 60 are for positioning (i.e. determining the position of) a component supported by the moveable structure 22 (in the illustrated example the component is the measurement probe 30), or at least part a specific part of the component (such as the tip of the measurement probe) within the working volume of the machine.

Upper and lowers ends of each extendable leg 60 are connected respectively to the upper structure 22 (specifically, the metrology part 22a of the upper structure 22) and lower structure 24 (specifically, the metrology part 24a of the lower structure 24) via individual ball joints 68. The upper and lower tubes 62, 64 of each extendable leg 60 enclose an elongate member 66, shown in dotted outline in one of the extendable legs of FIG. 5, with an encoder scale 10 affixed to the elongate member 66. The elongate member 66 is itself extendable, for example by way of a telescopic arrangement. Each elongate member 66 extends from its upper joint 68 to its lower joint 68, and it is the respective lengths of the elongate members 66 that determine the precise positioning and orientation of the metrology part 22a of the upper structure 22 (and therefore the measurement probe 30). It is therefore the length of the elongate members 66 that must be measured precisely during a measuring or scanning operation on a workpiece in order to determine the precise location of the tip of the stylus when it is contact with the workpiece surface.

The drive arrangement 28 in this embodiment is a so-called "tri-glide" arrangement as described, for example, in US 2003/0005786. The tri-glide arrangement is provided by three mechanical linkages 50 of substantially the same design that are connected in parallel between the moveable structure 22 and the fixed structure 24. Each mechanical linkage 50 comprises two substantially parallel rigid rods 52, 54 of fixed length, which act to maintain the moveable structure 22 at a substantially constant orientation as it moves around the working volume 34. Each mechanical linkage 50 also comprises a carriage 56, with the rods 52, 54 being pivotally coupled at their lower end to the carriage 56 and at their upper end to the drive part 22b of the moveable structure 22 via ball joints 58.

Three linear tracks 51 are arranged substantially vertically (substantially in parallel) on the drive part 24b of the fixed structure 24, with the three carriages 56 being arranged to move along (up and down) the three linear tracks 51 respectively. The three linear tracks 51 effectively form part of the fixed structure of the coordinate positioning machine 21, and can be considered as an extension to the fixed structure 24 (specifically, the drive part 24b of the fixed structure 24). Each carriage 56 is driven in a substantially linear manner along its corresponding respective track 51 by a linear drive mechanism, with the position of the linear drive mechanism being marked schematically by reference 29 in FIG. 3. The linear drive mechanism may comprise a linear motor. The linear drive mechanism may comprise a stepper motor.

Therefore, each mechanical linkage 50 is actuated by a drive mechanism which acts between the fixed structure (linear track) 51 and the mechanical linkage 50. More particularly, the drive mechanism acts between the fixed structure (linear track) 51 and an end of the mechanical linkage 50, i.e. the carriage 56. In other words, the drive mechanism effectively couples the mechanical linkage directly to the fixed structure ("coupled to ground"), providing a force therebetween which acts to push or pull the mechanical linkage (for a linear drive mechanism) or rotate the mechanical linkage (for a rotary drive mechanism). There is no additional moveable linkage between the drive mechanism and the fixed structure, where such an additional linkage can cause movements of the driven part of the mechanical linkage that are not produced by the drive mechanism itself.

For example, with the "tri-glide" drive arrangement illustrated in FIGS. 5 to 8 (and more schematically in FIGS. 3 and 4), each carriage 56 is caused to be driven linearly up and down its respective track 51 by the action of the motor (not shown) associated with that carriage 56, and not by the action of any other motor associated with other carriages 56. In the case of a typical hexapod drive arrangement (as shown in FIG. 1), the motor in a particular extendable leg is only capable of extending or retracting the leg linearly along its length, and yet in use each leg will be moving laterally as well; the lateral movement of a leg (and its associated motor) must result from the action of other motors in other legs, so that each motor is actually moving the weight of other struts (along with their respective motors).

Therefore, with such a drive arrangement as illustrated in FIGS. 3 to 8, the moving parts can be kept relatively light-weight, in this example being thin and light-weight rods 52, 54, and it is not the case (as it is with a typical hexapod drive arrangement having six extendable legs such as that shown in FIG. 1) that each motor is moving around the weight of other motors. This allows a light-weight drive arrangement that is able to move quickly with high accelerations and rapid changes of direction.

Returning to a more schematic format, operation of the tri-glide embodiment will now be described with reference to FIGS. 9A to 9E. Each of FIGS. 9A to 9E uses a similar representation to that used in FIG. 3, with the two carriages being labelled as 56a and 56b respectively and the two linear tracks being labelled 51a and 51b respectively.

Due to the constraints provided by the parallel rods 52, 54 described above with reference to FIGS. 5 to 8, motion of the moveable structure 22 (by operation of the tri-glide drive arrangement 28) is restricted to three translational degrees of freedom, so that the moveable structure 22 retains a substantially constant orientation as it moves around the working volume. This constraint to movement in three degrees of freedom is indicated by arrows labelled 3DOF in FIG. 9A.

Figure 9A:
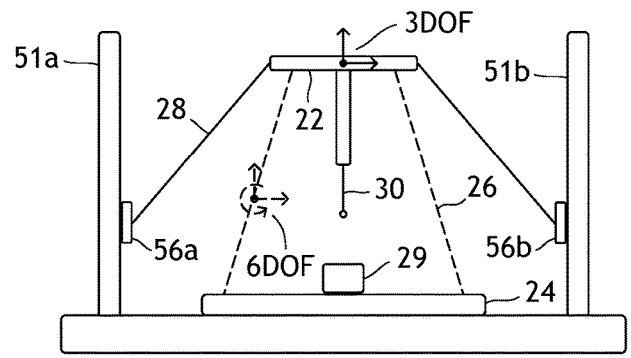
FIGS. 9A to 9E are schematic illustrations of the operation of an embodiment of the present invention.

On the other hand, with six extendable legs 60 of the hexapod metrology arrangement 26, comprising six corresponding measurement transducers in a parallel arrangement, six corresponding respective measurements are provided from which the position of the moveable structure is determinable in all six degrees of freedom, as indicated by arrows labelled 6DOF in FIG. 9A.

Figure 9B:
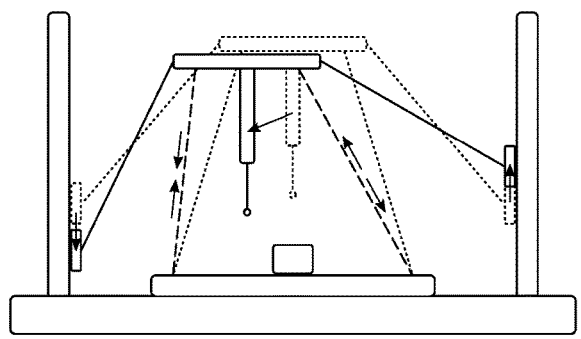
Figure 9C:
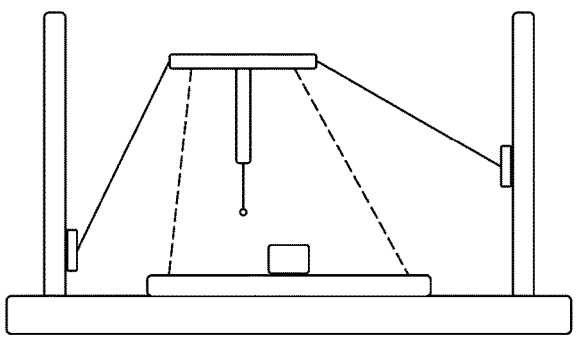

As illustrated in FIG. 9B, by lowering carriage 56a and raising carriage 56b along their respective tracks 51a, 51b, because the rods 52, 54 of the mechanical linkages 50 are of fixed length, the moveable structure 22 (and along with it the measurement probe 30) is moved leftward and downward within the working volume 34, maintaining substantially the same orientation. This causes the extendable leg 60 closest to carriage 56a to shorten and the extendable leg 60 closest to carriage 56b to lengthen, with these changes in length being measured by measurement transducers (e.g. encoders) 10 in the extendable legs 60. From those transducer measurements, the position of the moveable structure 22 within the working volume 34 can be determined, and because the measurement probe 30 is in a known and fixed spatial relationship to the moveable structure 22, so too can the position of the measurement probe 30 (and probe tip) be determined. FIG. 9C is the same is FIG. 9B, but without the movement indications for clarity, thereby showing the final position of the components after the move operation.

Figure 9D:
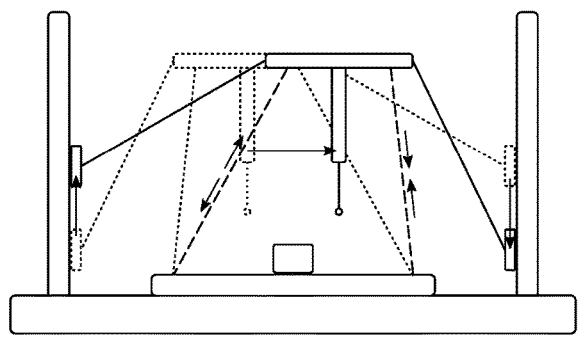
Figure 9E:
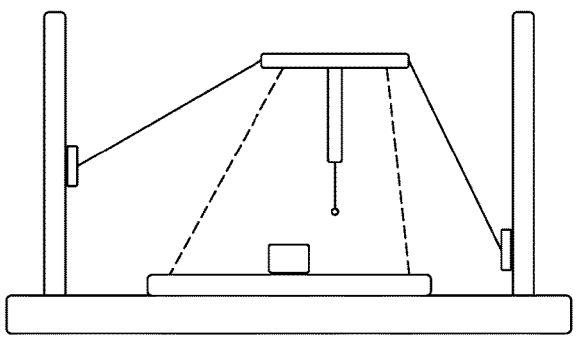

Similarly, as illustrated in FIG. 9D, by raising carriage 56a and lowering carriage 56b along their respective tracks 51a, 51b, the moveable structure 22 (and along with it the measurement probe 30) is can be moved rightward within the working volume 34, again maintaining substantially the same orientation. This causes the extendable leg 60 closest to carriage 56a to lengthen and the extendable leg 60 closest to carriage 56b to shorten, with these changes in length being measured by measurement transducers (e.g. encoders) 10 in the extendable legs 60. From those transducer measurements, the position of the moveable structure 22 and measurement probe 30 within the working volume 34 can be determined. FIG. 9E is the same is FIG. 9D, but without the movement indications for clarity, thereby showing the final position of the components after the move operation.

Figure 10:
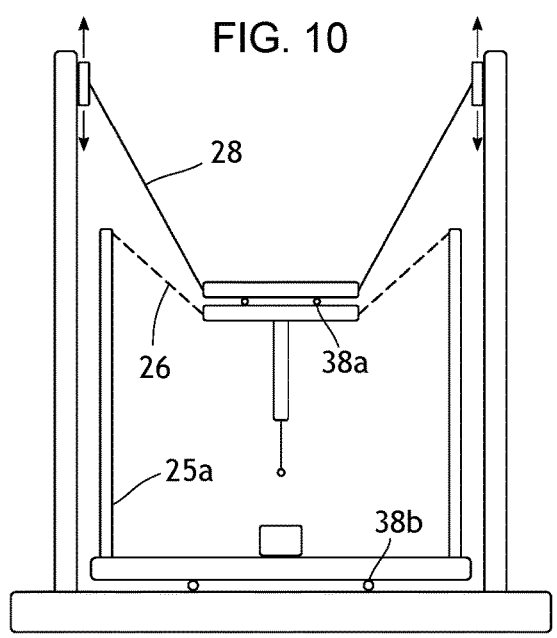
FIG. 10 is a schematic illustration of a top-down variant of the coordinate positioning machine of FIG. 4.

With the above-described tri-glide embodiment, the extendable legs 60 of the hexapod metrology arrangement 26 and the rods 50 of the drive arrangement 28 extend up from the bottom, and that embodiment can therefore be described as a "bottom up" arrangement. FIG. 10 shows an alternative "top down" arrangement, which is generally the same as the "bottom up" arrangement except that the extendable legs 60 of the hexapod metrology arrangement 26 and the rods 50 of the drive arrangement 28 extend down from the top (hence a "top down" arrangement). To enable this, a frame 25a is provided to support the hexapod metrology arrangement 26 so that it can effectively "hang" from the top. The frame 25a effectively forms part of the fixed structure of the coordinate positioning machine 21, as an extension to the fixed structure 24 (in this case, the hexapod part 24a of the fixed structure 24). As with the previous embodiment, a coupling arrangement 38a, 38b is provided to isolate the metrology arrangement 26 from the drive arrangement 28.

Figure 11:
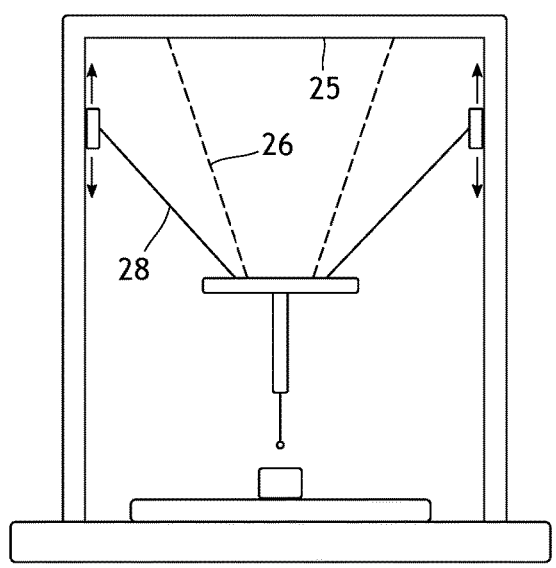
FIG. 11 is a schematic illustration of a variant of the top-down coordinate positioning machine of FIG. 10.

Yet another "top down" arrangement is illustrated schematically in FIG. 11. This differs from the FIG. 10 embodiment in that the hexapod metrology arrangement 26 is supported from a frame 25 which extends around the top, and is provided inside the tri-glide drive arrangement 28. The frame 25 effectively forms part of the fixed structure of the coordinate positioning machine 21, as an extension to the fixed structure 24 along with the vertical linear tracks 51 which also become part of the frame 25. Furthermore, the FIG. 11 embodiment is not provided with any coupling arrangement 38 to isolate the metrology arrangement 26 from the drive arrangement 28.

Figure 12:
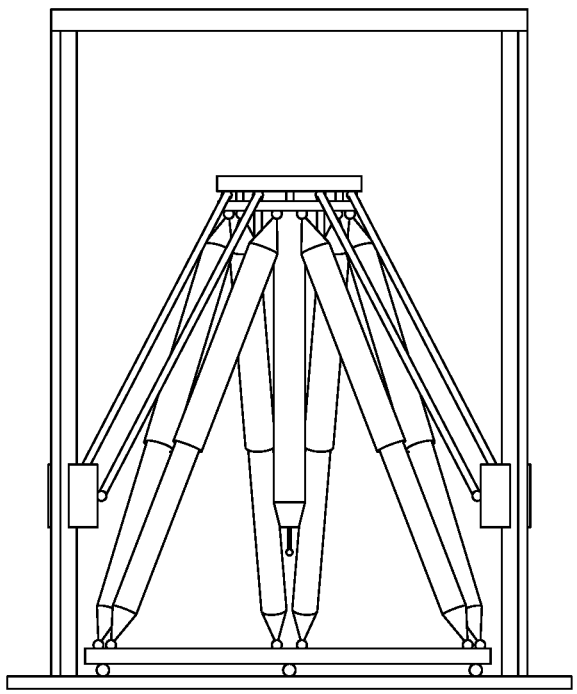
FIG. 12 shows a slight variant of the coordinate positioning machine of FIGS. 5 to 8.

For comparison with FIGS. 13 to 15, FIG. 12 is provided to show a practical tri-glide embodiment that corresponds closely to that described above with reference to FIGS. 5 to 8, differing mainly in having a closed frame, with extra rigidity and stability being provided to the vertical tracks 51 by way of the top plate of the frame. Like the previous embodiment, the metrology arrangement of FIG. 12 is decoupled from the drive arrangement at least to some extent both at the top (i.e. at the moveable structure) and at the bottom (i.e. at the fixed structure).

Figure 13:
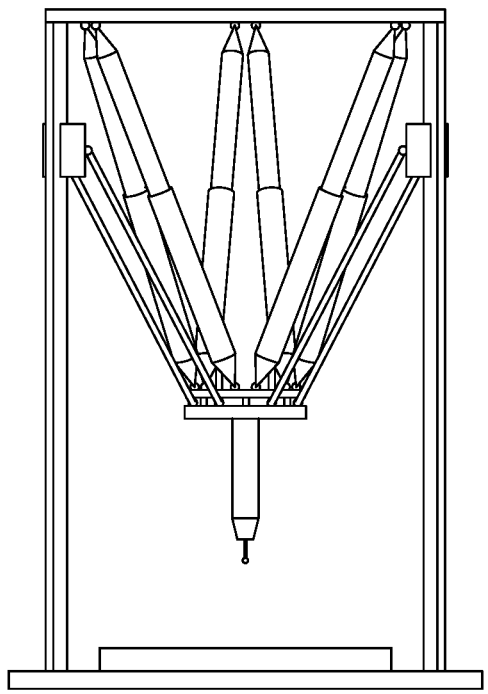
FIG. 13 shows a top-down variant of the coordinate positioning machine of FIG. 12.
Figure 14:
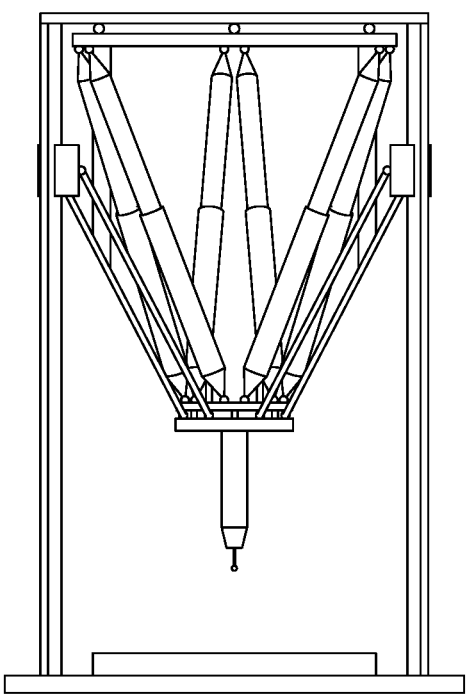
FIG. 14 shows a variant of the top-down coordinate positioning machine of FIG. 13.
Figure 15:
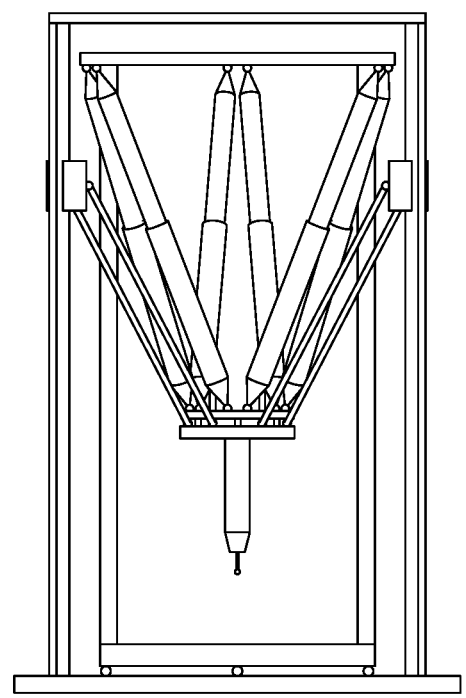
FIG. 15 shows another variant of the top-down coordinate positioning machine of FIG. 13.

FIG. 13 shows a practical embodiment of the "top down" arrangement illustrated schematically in FIG. 11, but differs from the FIG. 11 embodiment by decoupling the drive and metrology to some extent at the moveable structure. FIG. 14 is a variant of FIG. 13, providing decoupling of the drive and metrology both at the moveable structure and the fixed structure. FIG. 15 is a further variant, having a separate metrology frame arranged within a drive frame, with decoupling of the drive frame from the metrology frame both at the moveable structure and the fixed structure.

Figure 16A:
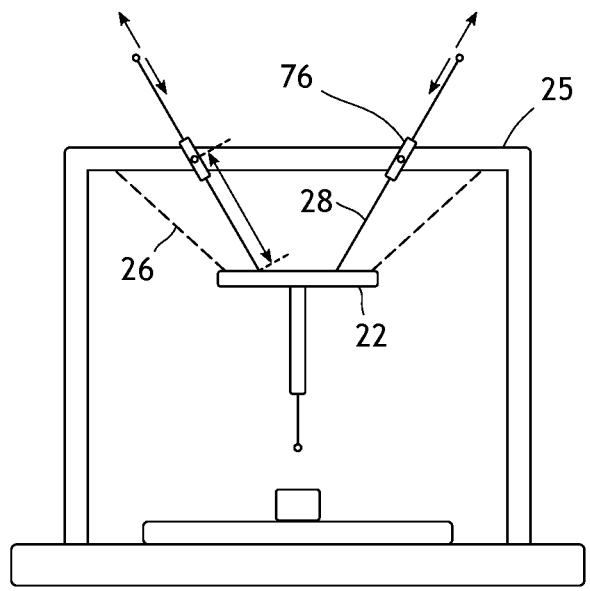
FIGS. 16A and 16B schematically illustrate an embodiment having a different type of non-hexapod drive arrangement.

It will be understood that the present invention is not limited to embodiments in which the drive arrangement 28 is in the form of a tri-glide. FIG. 16A schematically illustrates an embodiment in which the hexapod metrology arrangement 26 is coupled with a different type of non-hexapod drive arrangement 28. Rather than a fixed-length rod 52 one end of which is driven linearly along a track 51 by a carriage 56 as with the tri-glide embodiment, in the embodiment of FIG. 16A a fixed-length extending rod is instead driven through a pivoting guide 76 by a suitable linear drive mechanism provided within the guide 76, thereby changing the separation indicated by the arrow in FIG. 16A and thereby moving the structure 22.

Figure 16B:
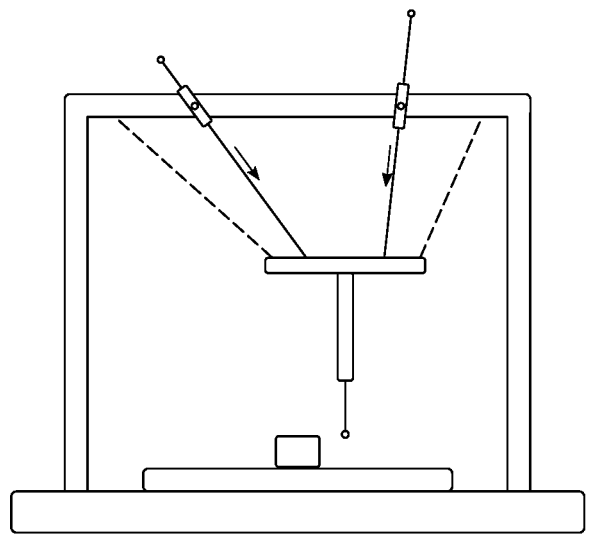

In FIGS. 16A and 16B, similar to FIG. 11, the metrology and drive arrangements 26, 28 are supported in a top-down manner from a frame 25, with the frame 25 forming part of the fixed structure of the coordinate positioning machine 21. From the position as illustrated in FIG. 16A, when both rods are driven downwards through their respective guides 76, the structure 22 can be moved to the position as illustrated in FIG. 16B. As before, the position of the structure 22 is measured by the hexapod metrology arrangement 26.

It will be appreciated that, as with the tri-glide arrangement, each mechanical linkage of the drive arrangement 28 in the FIG. 16A embodiment is actuated by a drive mechanism which acts between the fixed structure and the mechanical linkage, so this embodiment shares the same advantage in terms of speed and acceleration.

Figure 17:
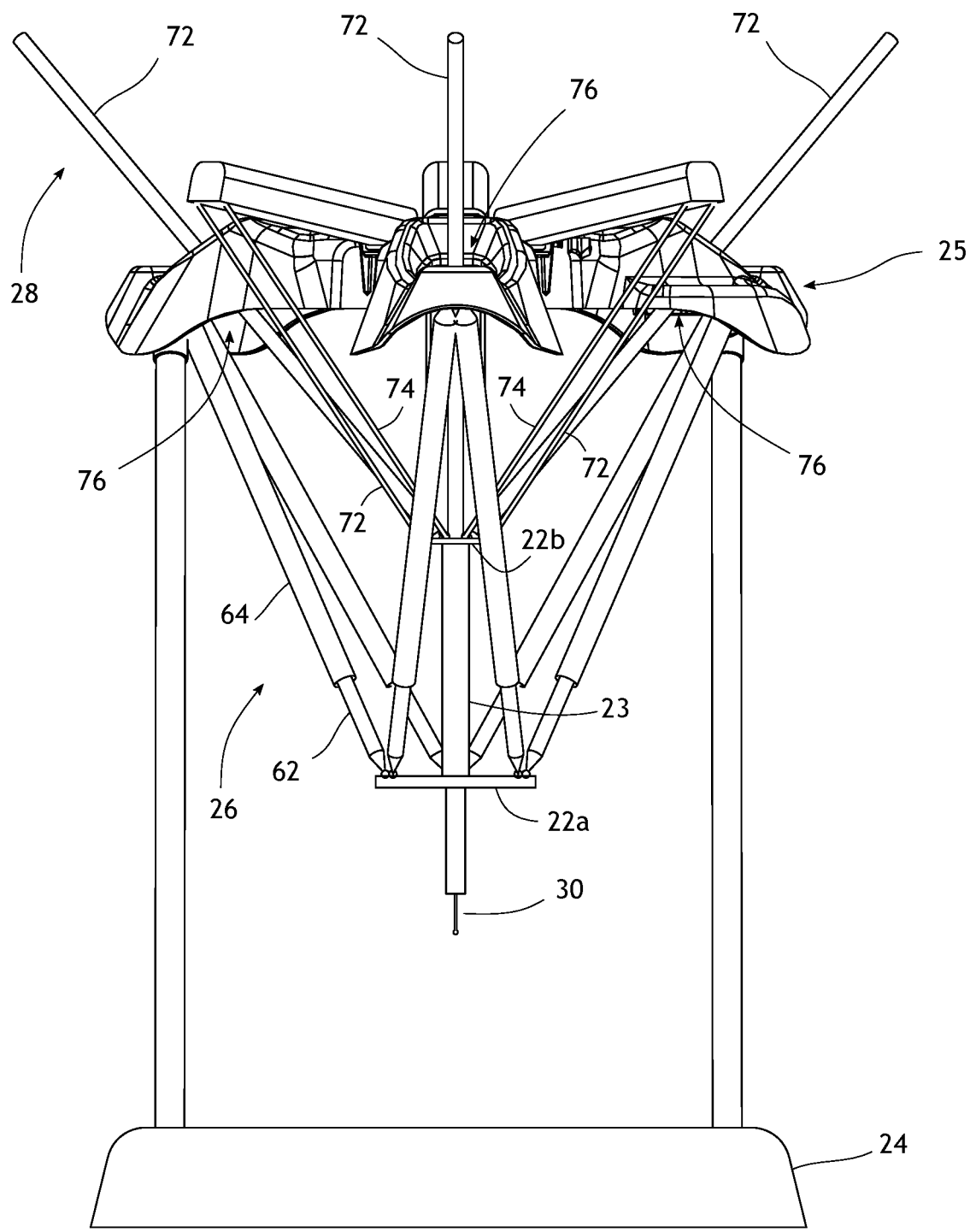
FIG. 17 illustrates a practical embodiment of the coordinate positioning machine of FIGS. 16A and 16B.

FIG. 17 illustrates a practical embodiment of the schematically-illustrated arrangement of FIG. 16A. The FIG. 17 embodiment is based closely on a non-Cartesian type of coordinate measuring machine sold by the present applicant, Renishaw plc, under the trade mark EQUATOR. The hexapod metrology arrangement 26 is generally similar to that of FIG. 5, comprising six extendable legs each having an upper tube 64 and a lower tube 62, with the lower tube 62 sliding telescopically within the upper tube 64. In this embodiment, the extendable legs are supported in a top-down arrangement from a frame 25 to a metrology platform 22*a* (part of the moveable structure 22). The pivoting guides 76 are obscured in FIG. 17 by the structure of the frame 25. Three fixed-length drive rods 72 pass through the three pivoting drive guides 76 respectively and are coupled at their lower end to a drive plate 22*b* (part of the moveable structure 22). In this embodiment the two parts 22*a*, 22*b* of the moveable structure 22 are separated spatially by rigid column 23. Three sets of parallel rod pairs 72, 74 are arranged to constrain motion in three degrees of freedom, similarly to the rods 52, 54 of FIG. 5.

Figure 18A:
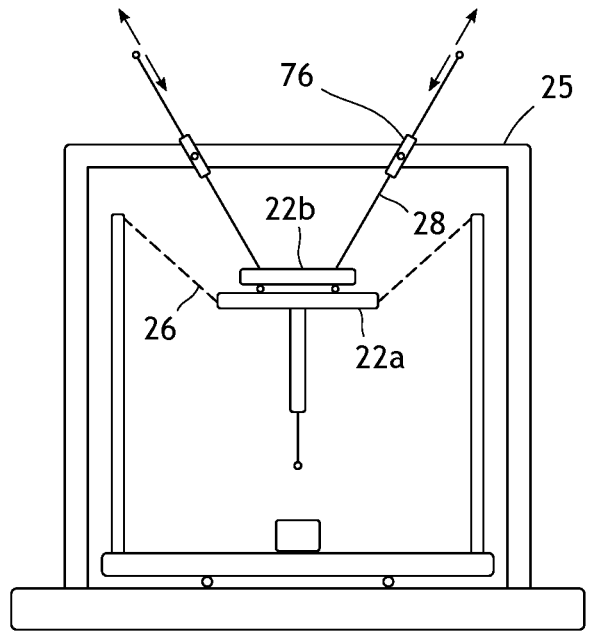
FIGS. 18A and 18B schematically illustrate a variant of the embodiment of FIGS. 16A and 16B in which the metrology arrangement is decoupled to some extent from the drive arrangement.
Figure 18B:
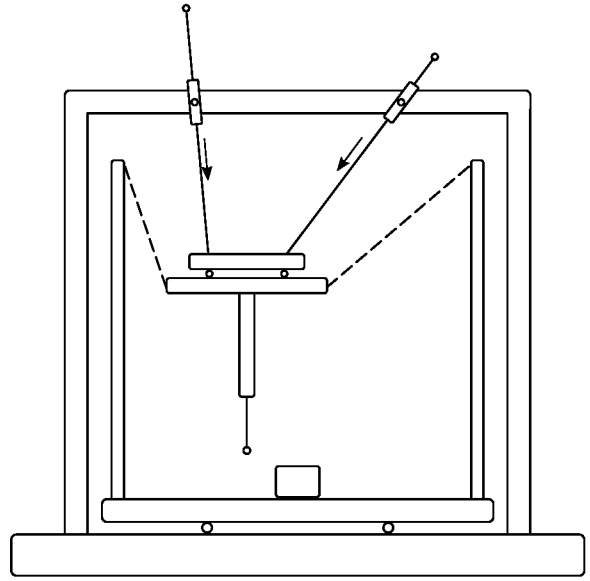
Figure 19:
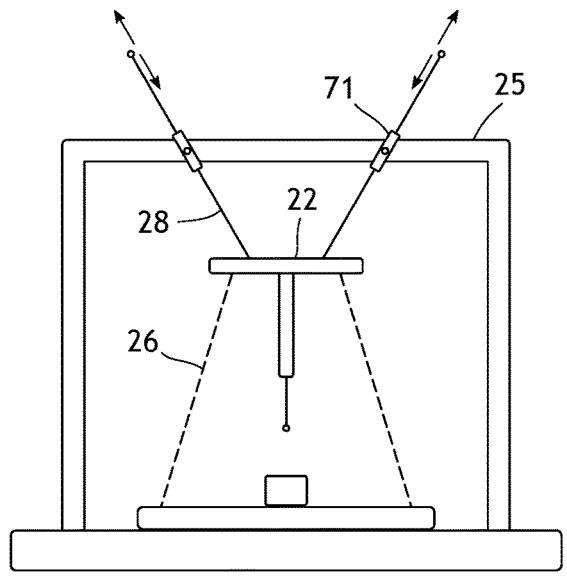
FIG. 19 schematically illustrates a variant of the embodiment of FIGS. 16A and 16B with a bottom-up rather than top-down hexapod metrology arrangement.

Returning to a more schematic representation, FIGS. 18A and 18B show a variant of the machine of FIGS. 16A and 16B, in which the metrology arrangement 26 is isolated further from the drive arrangement 28. This is analogous to the tri-glide embodiment described above with reference to FIG. 10, so a further description is not necessary. FIG. 19 shows an alternative to the FIG. 16A arrangement, with a bottom-up hexapod metrology arrangement 26 instead of a top-down arrangement.

Figure 20:
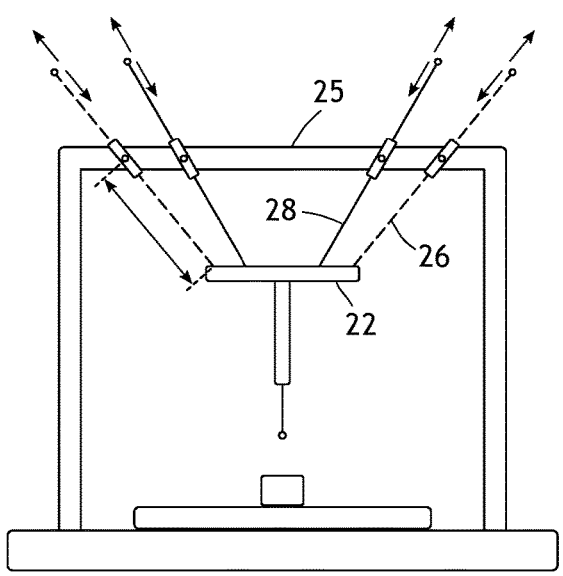
FIG. 20 schematically illustrates a variant of the embodiment of FIGS. 16A and 16B in which fixed-length metrology struts are used in the hexapod metrology arrangement.
Figure 21:
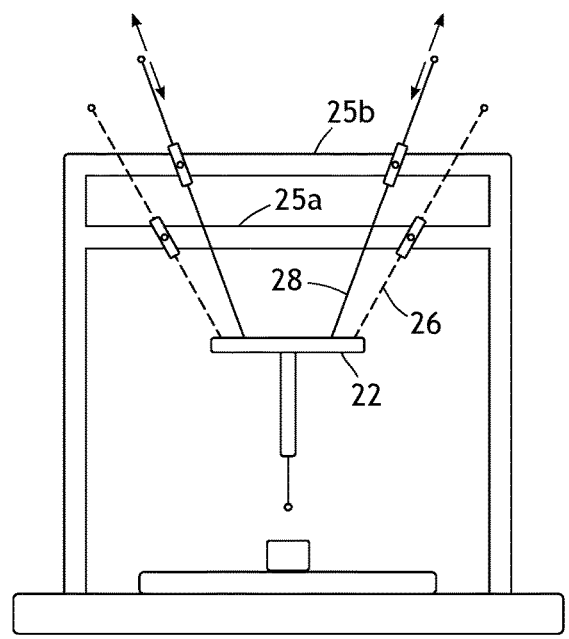
FIG. 21 schematically illustrates a variant of the embodiment of FIG. 20 in which an offset pivot plate is used for the metrology struts.

FIG. 20 schematically illustrates a variant of the embodiment of FIGS. 16A and 16B in which fixed-length metrology struts are used in the hexapod metrology arrangement 26, similar to the fixed-length struts of the drive arrangement 28 of that embodiment. The six fixed-length extending struts as illustrated in FIG. 20 is considered to functionally equivalent to the six extendable struts of previous embodiments, with the variable-length part of the strut being indicated by the arrow in FIG. 20; that part is equivalent to the extendable strut of previous embodiments. The term "extendable leg" and "extending leg" are therefore to be understood herein as being equivalent, meaning any type of mechanical arrangement or linkage between two points that allows the separation between those points to be varied. The drive arrangement 28 is still a non-hexapod drive arrangement because it only has three extending struts, as shown in more detail in FIG. 17. FIG. 21 schematically illustrates a variant of the embodiment of FIG. 20 in which a fixed support (pivot plate) 25*a* is used for the metrology struts that is offset spatially from the fixed support (pivot plate) 25*b* used for the drive struts.

Embodiments have been described above in which two different types of non-hexapod drive arrangement have been employed: a tri-glide linear drive arrangement (e.g. FIG. 5) and a pivoting linear drive arrangement (e.g. FIG. 17). There are many other possibilities for the drive arrangement, and just a few of these will be described briefly now; others will be apparent to the skilled person.

Figure 22:
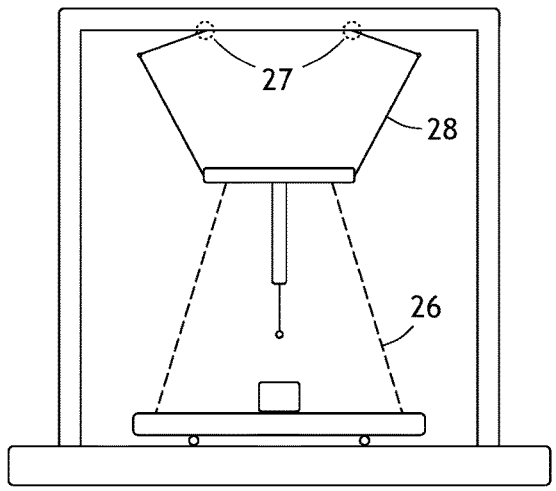
FIG. 22 schematically illustrates an embodiment having a delta robot type of non-hexapod drive arrangement.
Figure 23:
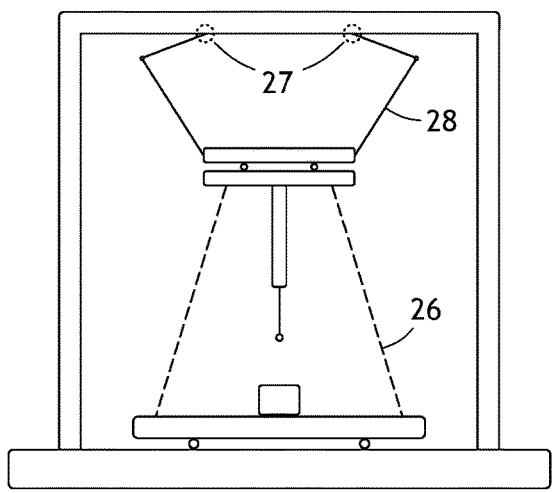
FIG. 23 schematically illustrates a variant of the embodiment of FIG. 22, having an increased amount of decoupling between the metrology and drive arrangements.
Figure 24:
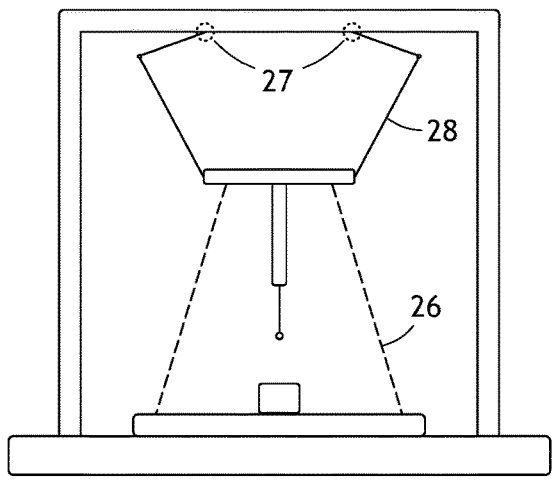
FIG. 24 schematically illustrates a variant of the embodiment of FIG. 22, having a decreased amount of decoupling between the metrology and drive arrangements.

FIG. 22 schematically illustrates an embodiment having a delta robot type of non-hexapod drive arrangement. A delta robot is a type of parallel robot, and an example is described in detail in U.S. Pat. No. 4,976,582. FIG. 23 schematically illustrates a variant of the embodiment of FIG. 22, having an increased amount of decoupling between the metrology and drive arrangements. FIG. 24 schematically illustrates a variant of the embodiment of FIG. 22, having a decreased amount of decoupling between the metrology and drive arrangements. It will be appreciated that, as with the tri-glide arrangement, with a delta robot arrangement each mechanical linkage is actuated by a drive mechanism which acts between the fixed structure and the mechanical linkage, so these delta robot embodiments share the same advantage in terms of speed and acceleration (with a delta robot arrangement the drive mechanism is a rotary drive mechanism, whereas with a tri-glide arrangement the drive mechanism is a linear drive mechanism). Furthermore, with appropriate constraints (such as described in U.S. Pat. No. 4,976,582) the delta robot drive arrangement 28 can be adapted to provide movement to the structure 22 in three degrees of freedom, i.e. in fewer degrees of freedom than is being measured by the hexapod metrology arrangement 26.

Figure 5:
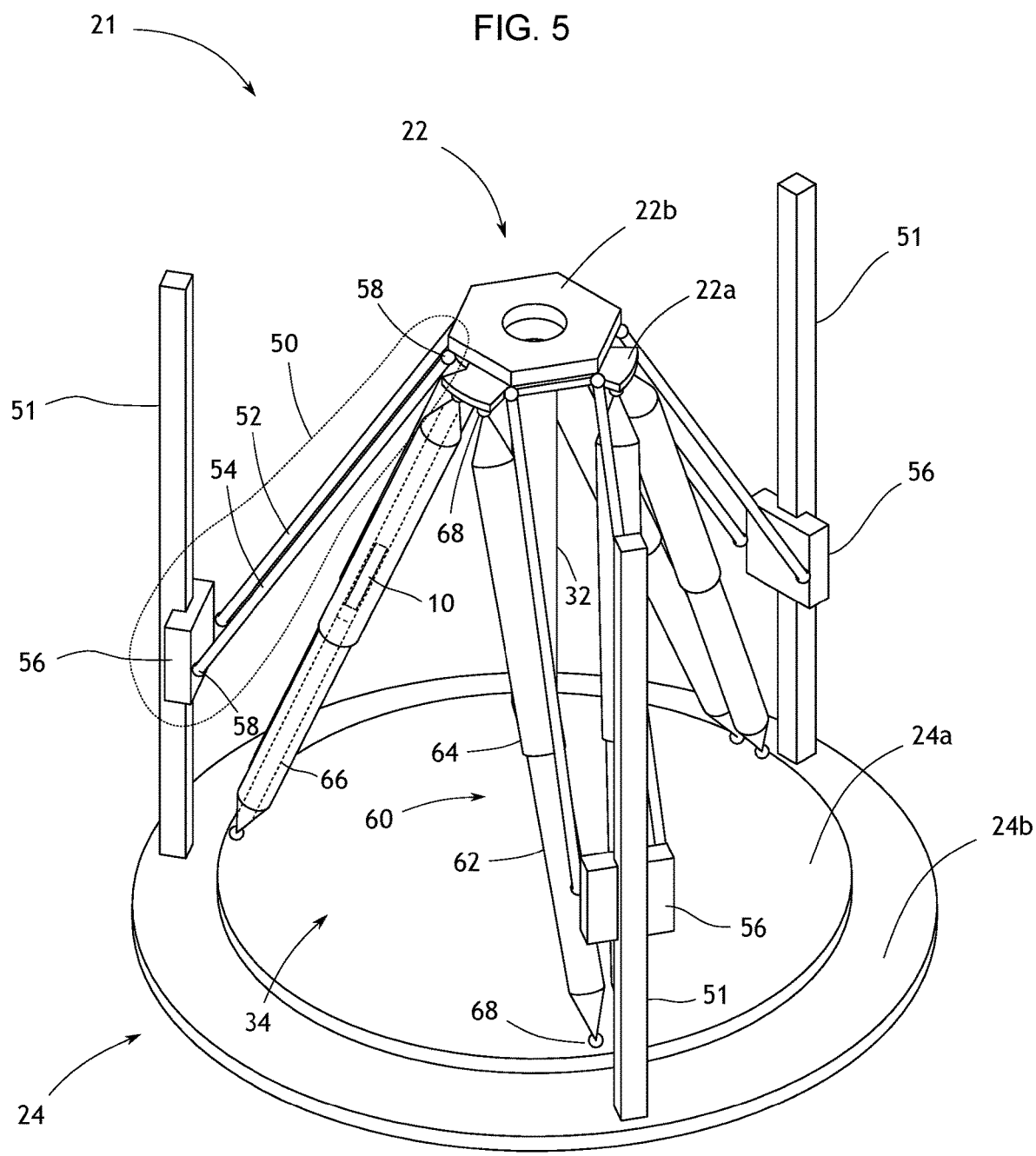
FIG. 5 shows a first perspective view of a practical embodiment of the coordinate positioning machine of FIG. 4.
Figure 6:
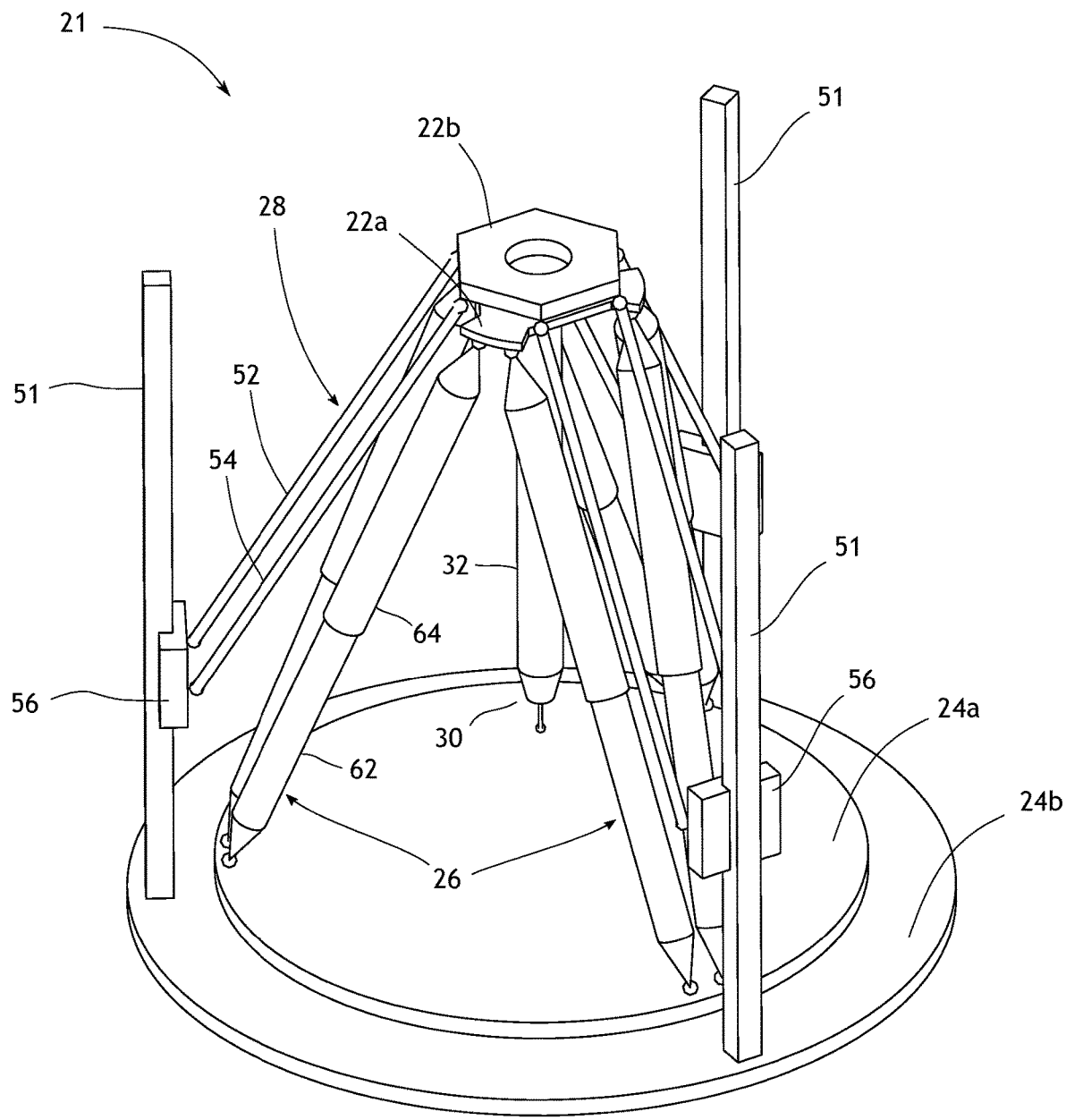
FIG. 6 shows a second perspective view of the embodiment of FIG. 5.
Figure 7:
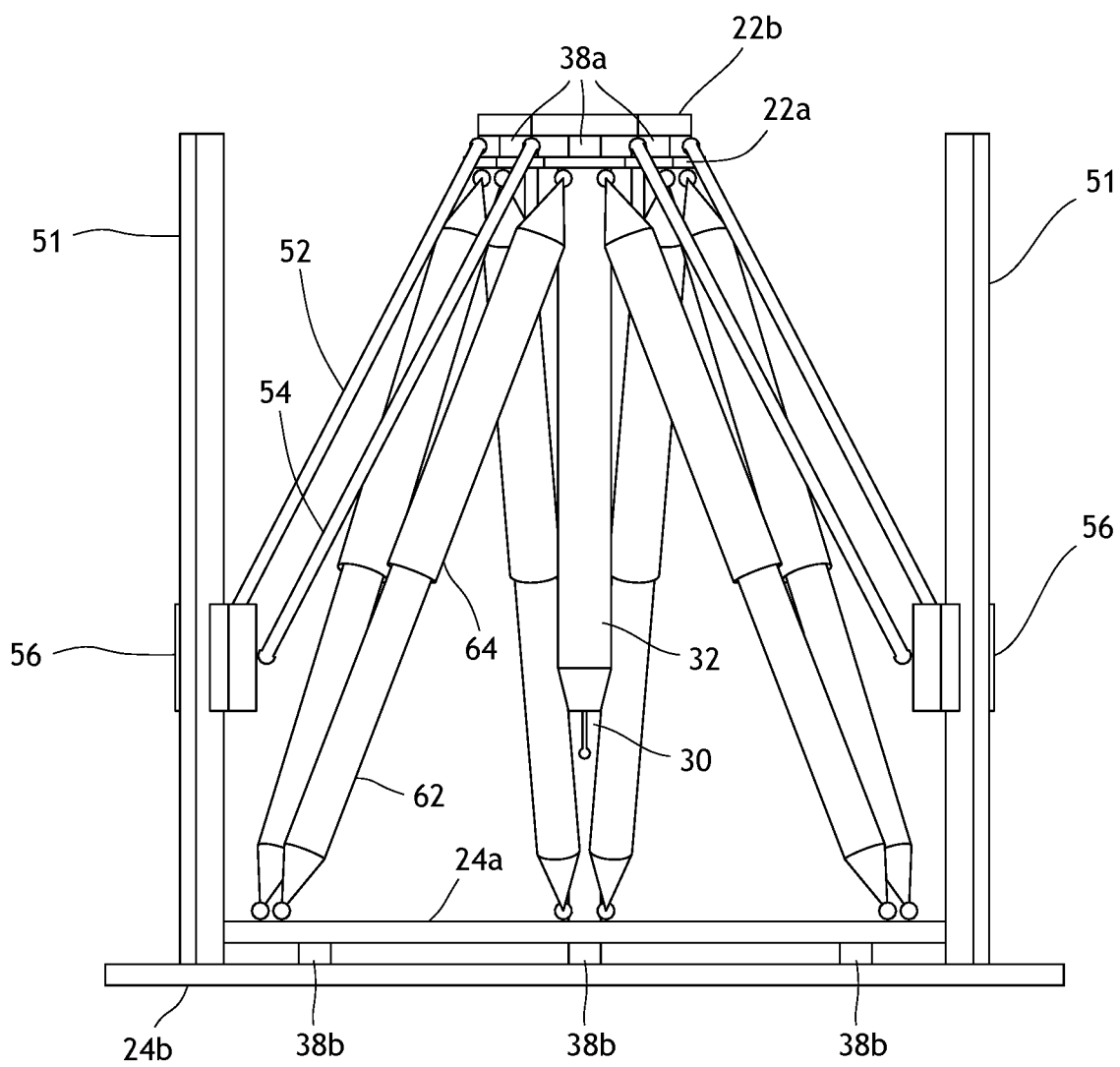
FIG. 7 shows a side view of the embodiment of FIG. 5.
Figure 8:
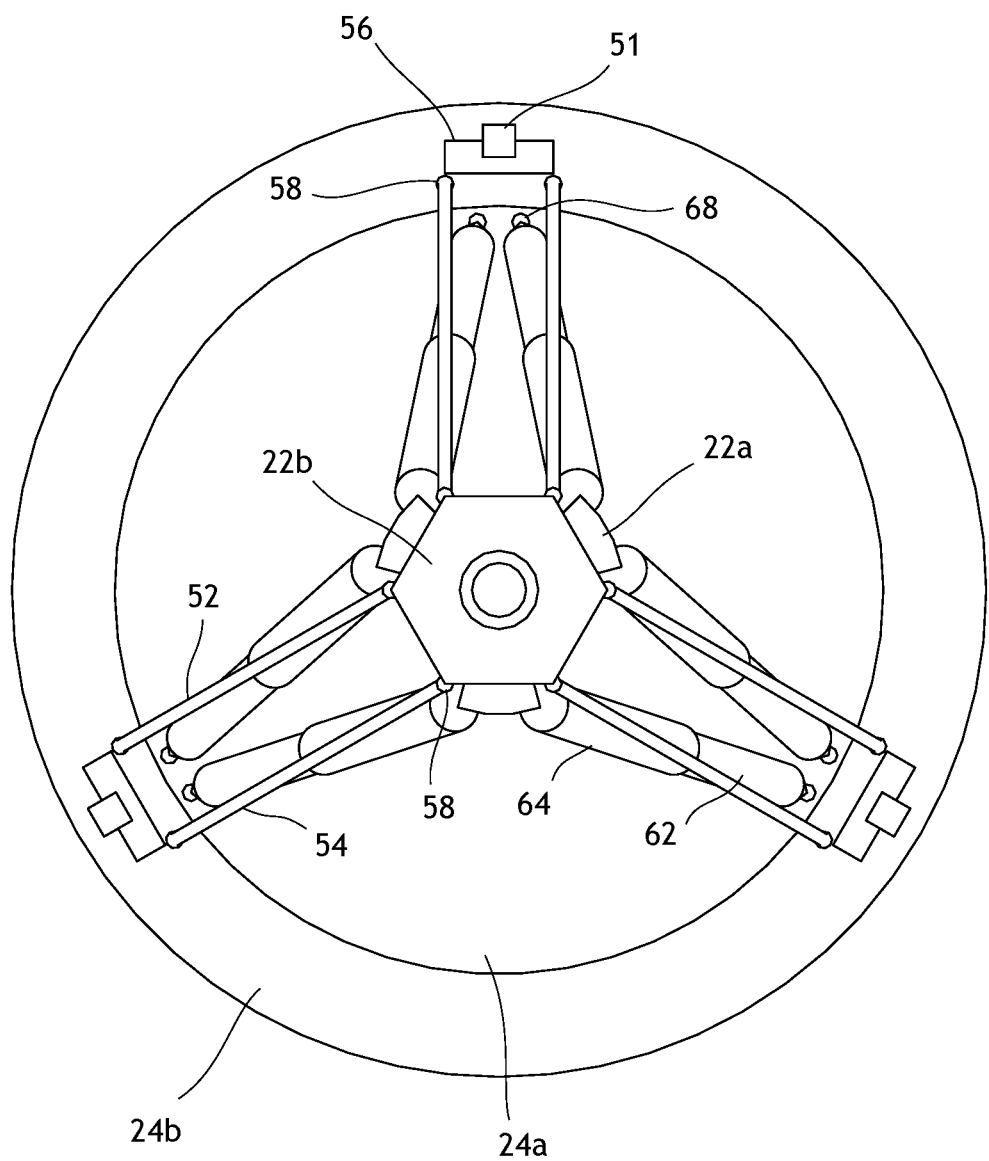
FIG. 8 shows a top view of the embodiment of FIG. 5.

The position of the rotary drive mechanism is indicated by reference 27 in FIG. 22, while the position of the linear drive mechanism is indicated by reference 29 in FIG. 3. In each case, the drive mechanism acts directly between the fixed structure and the drive arrangement. In the case of FIG. 3, the drive mechanism acts to drive the carriage 56 (which forms part of the drive arrangement, e.g. as part of a mechanical linkage 50 as shown in FIG. 5), while in the case of FIG. 22 the drive mechanism acts to drive (rotate) the upper part of the mechanical linkage that is attached between the moveable structure and the fixed structure.

Another example of a non-hexapod drive arrangement that is suitable for use in an embodiment of the present application is a cable-driven robot arrangement (otherwise known as a cable-suspended robot, or just a cable robot, or a wire-driven robot). This is a type of parallel manipulator (parallel kinematic arrangement) in which a plurality of flexible cables are used as actuators. One end of each cable is wound around a rotor turned by a corresponding respective motor, and the other end is connected to the end effector. An example of a cable robot is disclosed in US 2009/0066100 A1. Since cables are typically much lighter than the rigid linkages of a serial or parallel robot, the end effector of a cable robot can achieve high accelerations and velocities.

Because of the high measurement rate and dynamic bandwidth achievable with a hexapod metrology arrangement, as well as the high accuracy, the combination of a hexapod metrology arrangement with a cable drive arrangement is particularly advantageous.

Figure 25:
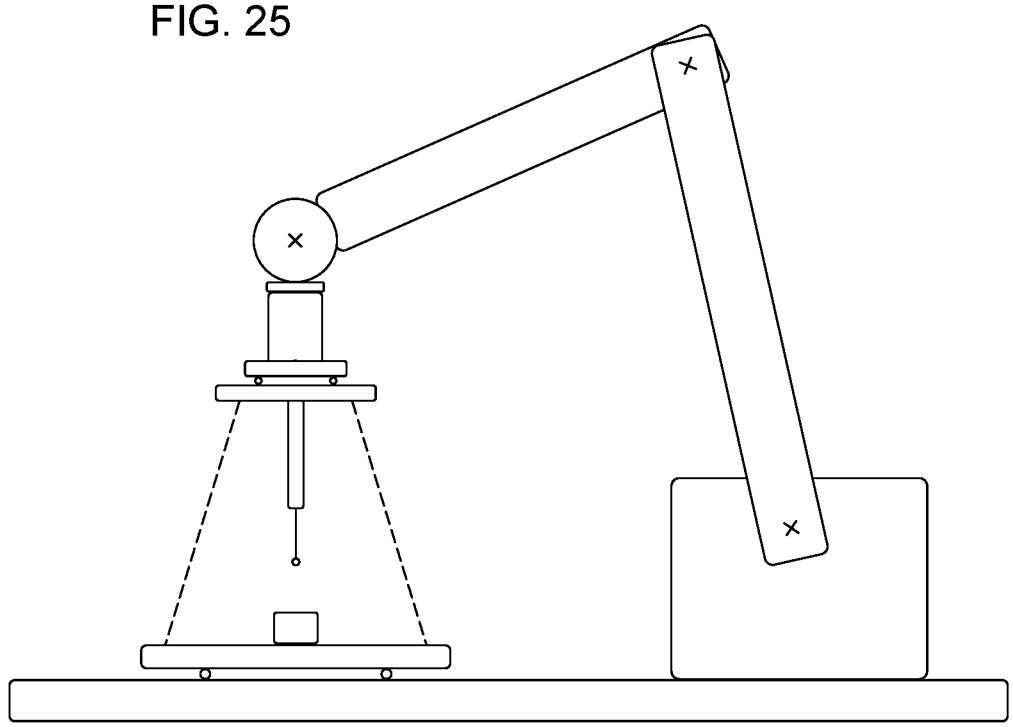
FIG. 25 schematically illustrates an embodiment having a serial kinematic type of non-hexapod drive arrangement.
Figure 26:
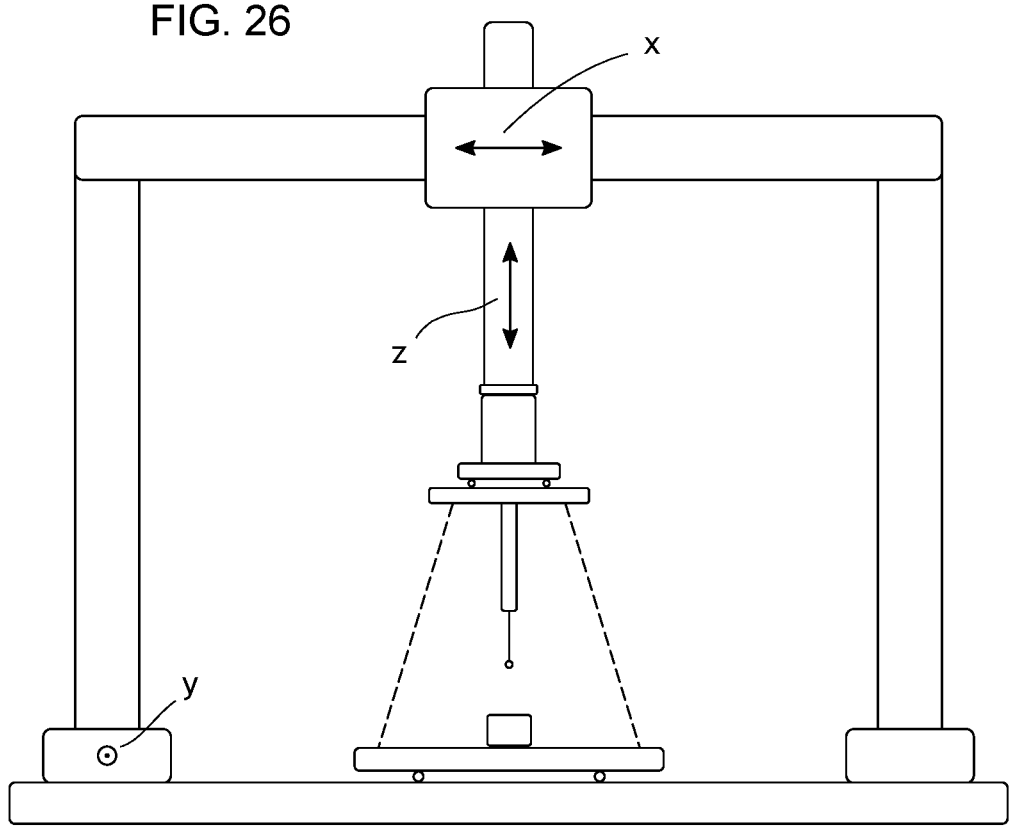
FIG. 26 schematically illustrates another embodiment having a serial kinematic type of non-hexapod drive arrangement.

Other types of non-hexapod drive arrangements are also envisaged. For example, FIG. 25 schematically illustrates an embodiment having a serial kinematic (as opposed to parallel kinematic) type of non-hexapod drive arrangement, having a plurality of segments or links connected in series by rotational joints, with one end of the drive arrangement being attached to ground and the other end being attached to the metrology arrangement. As with the embodiment illustrated in FIG. 4, the drive arrangement illustrated in FIG. 25 is attached to the metrology arrangement via a coupling that helps to prevent drive-related distortions being transferred to the metrology arrangement. FIG. 26 schematically illustrates another embodiment having a serial kinematic type of non-hexapod drive arrangement, having three parts connected in series that are moveable respectively along orthogonal axes x, y and z (as marked in FIG. 26). Therefore, the embodiment of FIG. 26 has a Cartesian type of serial drive arrangement, whereas the embodiment of FIG. 25 has a non-Cartesian type of serial drive arrangement. These types of drive arrangement are well known and no further explanation of them is required here.

Figure 27:
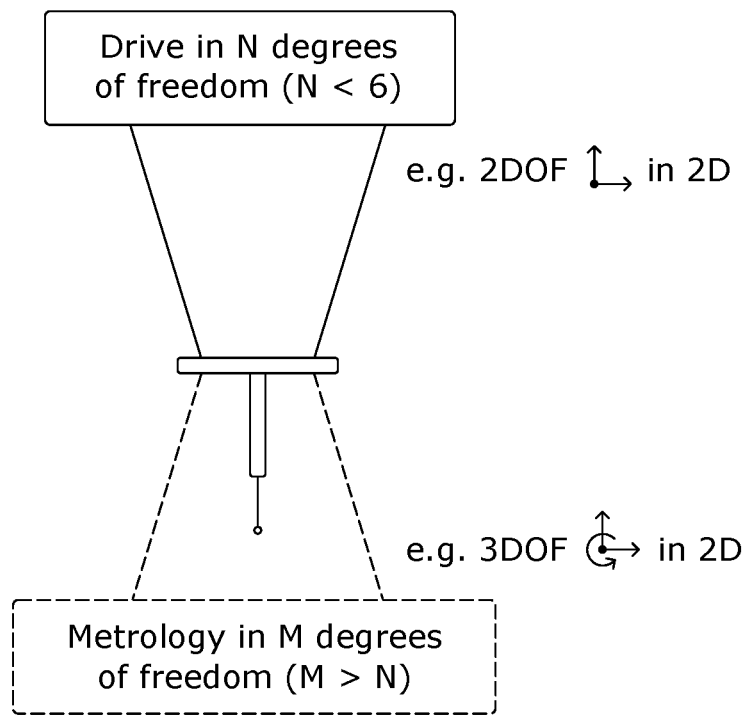
FIG. 27 illustrates the concept of providing a drive arrangement having fewer degrees of freedom than the metrology arrangement.

As explained above particularly with reference to FIG. 9A, the drive arrangement 28 provides three translational degrees of freedom to the moveable structure 22, while the hexapod metrology arrangement 26 is adapted to measure in six degrees of freedom. According to one aspect of the present invention, a coordinate positioning machine is proposed which comprises a structure moveable within a working volume of the machine, a drive arrangement for moving the structure around the working volume in fewer than six degrees of freedom, and a metrology arrangement for measuring the position of the structure within the working volume in more degrees of freedom than the drive arrangement. This is illustrated schematically in FIG. 27. One or both of the drive and metrology arrangements can be a parallel kinematic arrangement, such as a hexapod arrangement, tri-glide arrangement or a delta robot arrangement. In particular, it is to be noted that in this aspect the metrology arrangement need not be a hexapod metrology arrangement.

It is not normal to provide measurement, particularly direct measurement, in more degrees of freedom than movement. Typically, there would be N drive parts (rotary or linear) with each drive part being encoded separately to give N corresponding measurements. For example, for a three-axis CMM there are three driven linear axes, each with a position encoder, and therefore three corresponding measurements (i.e. driving and measuring both in three degrees of freedom). For a hexapod there are six variable-length struts, each with a position encoder, and six corresponding measurements (i.e. driving and measuring both in six degrees of freedom).

Figure 28:
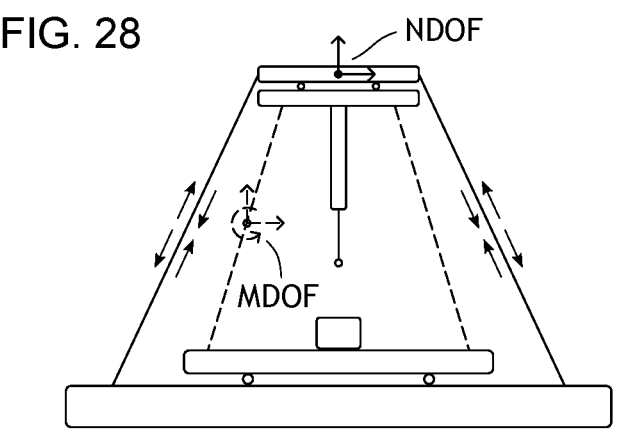
FIG. 28 illustrates a dual hexapod arrangement in which the hexapod drive arrangement has constrained movement.

However, the present applicant has appreciated the desirability and advantage of being able to provide a drive that is relatively inaccurate and constrained to move in a limited number of degrees of freedom (e.g. three) coupled with a separate metrology arrangement that is highly accurate and capable of measuring in all six degrees of freedom, and hence which is capable of compensating for any inaccuracies in the mechanically-constrained drive arrangement. For example, where the moving platform is constrained to translate within the working volume without rotation, there might be some inadvertent rotation of the platform caused by distortions or other types of inaccuracy in the structure, at least some of which may be caused by dynamic effects associated with high-speed motion. Such rotations would be detected by measuring in more degrees of freedom than driving. It is even possible to apply the scheme of FIG. 27 to a dual hexapod arrangement as illustrated schematically in FIG. 28, in which the drive hexapod is constrained to movement in less than six degrees of freedom by an appropriate mechanical constraint.

There are many other forms of non-hexapod drive arrangement, or drive arrangements that are constrained to fewer than six degrees of freedom, as will be apparent to the skilled person. For example, there are many possible variants of the tri-glide arrangement shown. One variant is to provide an arrangement having more than three drives and associated mechanical linkages. And, instead of vertical tracks 51 as illustrated in FIG. 3, the tracks may instead be arranged horizontally, e.g. radially outward from a point, so that movement of the structure 22 is also effected by movement of the carriages 56 along the horizontal tracks. Many other such possibilities exist.

Although embodiments of the present invention have been described mainly in relation to the use of a contact probe, in which a stylus of the contact probe makes physical contact with the workpiece surface to take a measurement, it will be appreciated that the invention is not limited to contact probes. The same concepts are applicable equally to non-contact probes, such as optical probes, in which a surface is sensed without making physical contact. The invention is generally applicable to any surface sensing device that is adapted to sense a surface, whether by contact or not. The invention can also be applied to the positioning of a component other than a surface sensing device, for example for orienting a component part of an article during manufacture of the article. Or, the component could be a tool, or a part thereof, such as a tool typically found in a machine tool for shaping or machining metal or other rigid materials. The component could be the moveable structure itself. The component may comprise a camera for imaging the surface of the workpiece. The component may comprise an eddy current probe for detecting and/or measuring eddy current at or near the surface of the workpiece. Many other possibilities would be apparent to the skilled person.

It is to be noted that in an embodiment of the present invention the hexapod metrology arrangement 26 is not provided purely for calibration purposes, to be coupled temporarily to the moveable structure to perform calibration of a combined drive and metrology arrangement, and then removed for operational use of the machine. Rather, the hexapod metrology arrangement is intended to remain coupled to the movable structure to provide position measurements relating to the moveable structure during operational use. In an embodiment of the present invention, in contrast to a calibration-only metrology arrangement, the movable structure is adapted to carry an operational tool with the metrology and drive arrangements also coupled to the moveable structure. The hexapod metrology arrangement may be coupled to the moveable structure via a different attachment than that used for attaching the operational tool to the moveable structure. The hexapod metrology arrangement may be coupled directly to the moveable structure (e.g. rather than via an attachment intended primarily for the operational tool).

Figure 29:
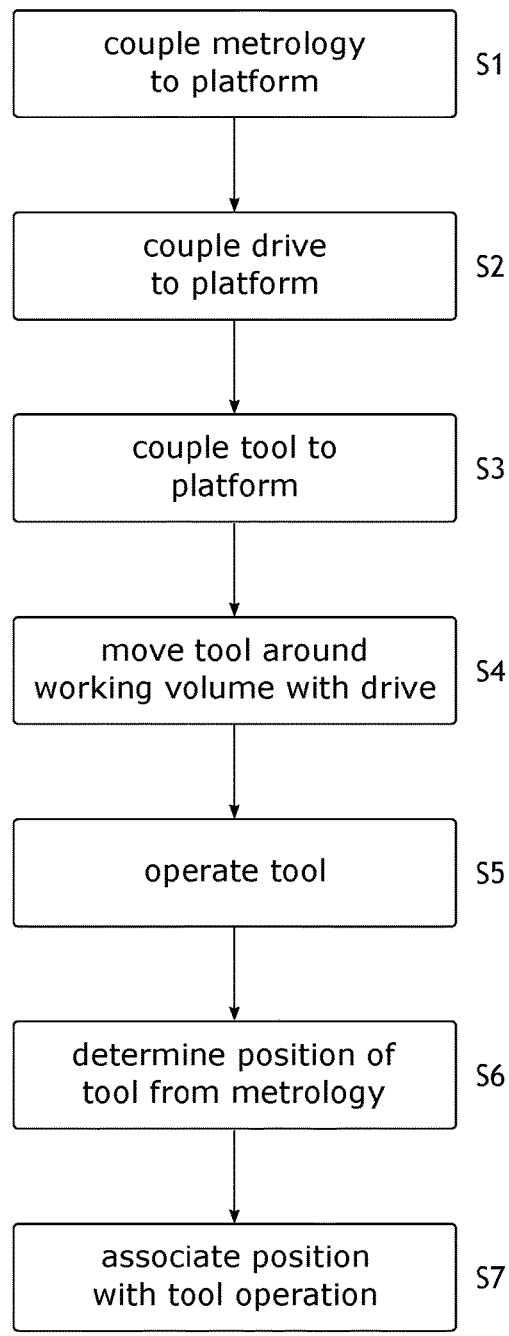
FIG. 29 is a flow diagram representing a method of controlling a coordinate positioning machine embodying the present invention.

A method of controlling a coordinate positioning machine is illustrated by the flow chart of FIG. 29. In step S1, the metrology arrangement 26 is coupled to the moveable structure (or platform) 22. In step S2, the drive arrangement 28 is coupled to the moveable structure (or platform) 22. In step S3, the tool (e.g. measurement probe 30 or cutting tool) is coupled to the moveable structure (or platform) 22. Thus, at this point, all three are coupled to the moveable structure (or platform) 22. In step S4, the drive arrangement 28 is used to move the tool around the working volume 34 (with the metrology arrangement 26 also still coupled to the moveable structure). In step S5, an operation is performed with the tool, such as performing a touch trigger operation on the workpiece surface with a measurement probe 30 or performing a machining operation on the workpiece surface with a cutting or machining tool. In step S6, the metrology arrangement 26 is used to determine the position of the tool within the working volume 34 when the operation took place (e.g. to enable the position of the tip of the measurement probe 30 or cutting tool to be determined). In step S7, the determined position is associated with the performed operation (e.g. so that a touch trigger event can be associated with the position measurement for that event).

It will be appreciated that operation of the coordinate measuring machine 21 can be controlled by a program operating on the machine 21, and in particular by a program operating on a coordinate measuring machine controller such as the controller C illustrated schematically in FIG. 3. It will be appreciated that control of the extendable legs can be provided by a program operating on the controller C. Such an operating program can be stored on a computer-readable medium, or could, for example, be embodied in a signal such as a downloadable data signal provided from an Internet website. The appended claims are to be understood as covering an operating program by itself, or as a record on a carrier, or as a signal, or in any other form.

Although the above embodiments have been described mainly in the context of a coordinate measuring machine, the concepts are applicable more generally to any type of coordinate positioning machine, such as comparators, scanning machines, machine tools, positioning devices (e.g. for optical components), prototype manufacturing machines and various other uses.

What is claimed is:

1. A coordinate positioning machine comprising a structure moveable within a working volume of the machine, a drive arrangement for moving the structure around the working volume in fewer than six degrees of freedom, and a metrology arrangement for measuring the position of the structure within the working volume in more degrees of freedom than the drive arrangement.

2. A coordinate positioning machine as claimed in claim 1, wherein the metrology arrangement is a hexapod metrology arrangement and/or wherein the drive arrangement is a non-hexapod drive arrangement.

3. A coordinate positioning machine as claimed in claim 1, wherein the metrology arrangement is adapted to measure the position of the structure in six degrees of freedom and/or wherein the drive arrangement is adapted to move the structure around the working volume in three degrees of freedom.

4. A coordinate positioning machine as claimed in claim 1, wherein the metrology arrangement comprises a plurality of measurement transducers in a parallel arrangement for providing a corresponding respective plurality of distance measurements from which the position of the moveable structure is determinable.

5. A coordinate positioning machine as claimed in claim 4, wherein the metrology arrangement comprises six measurement transducers in a parallel arrangement for providing six corresponding respective measurements from which the position of the moveable structure is determinable.

6. A coordinate positioning machine as claimed in claim 5, wherein the metrology arrangement comprises six extendable legs arranged in parallel, with the six measurement transducers being associated respectively with the six extendable legs.

7. A coordinate positioning machine as claimed in claim 4, wherein the drive arrangement comprises a plurality of actuators in a parallel arrangement.

8. A coordinate positioning machine as claimed in claim 4, wherein the drive arrangement comprises a plurality of measurement transducers, separate to those of the metrology arrangement, for providing corresponding respective measurements from which the position of the moveable structure is determinable independently of the position determined based on the measurements from the metrology arrangement.

9. A coordinate positioning machine as claimed in claim 1, wherein the metrology arrangement and drive arrangement are each arranged between the moveable structure and a fixed structure of the machine.

10. A coordinate positioning machine as claimed in claim 9, wherein the drive arrangement comprises a plurality of mechanical linkages connected in parallel between the moveable structure and the fixed structure, with each mechanical linkage being actuated by a drive mechanism which acts between the fixed structure and the mechanical linkage.

11. A coordinate positioning machine as claimed in claim 10, wherein the drive mechanism is a linear drive mechanism or a rotary drive mechanism.

12. A coordinate positioning machine as claimed in claim 1, wherein the drive arrangement is coupled to the metrology arrangement via a coupling arrangement which prevents at least some distortion associated with the drive arrangement from being transferred to the metrology arrangement.

13. A coordinate positioning machine as claimed in claim 12, wherein the coupling arrangement is a kinematic or pseudo-kinematic coupling arrangement.

14. A coordinate positioning machine as claimed in claim 12, wherein the moveable structure comprises a drive part associated with the drive arrangement and a metrology part associated with the metrology arrangement, with the drive part of the moveable structure being coupled to the metrology part of the moveable structure via the coupling arrangement.

15. A coordinate positioning machine as claimed in claim 12, wherein the fixed structure comprises a drive part associated with the drive arrangement and a metrology part associated with the metrology arrangement, with the drive part of the fixed structure being coupled to the metrology part of the fixed structure via the coupling arrangement.

16. A coordinate positioning machine as claimed in claim 1, wherein the moveable structure carries a tool.

17. A coordinate positioning machine as claimed in claim 16, wherein the machine is a coordinate measuring machine or a comparator and wherein the tool is for example a surface sensing device or a measurement probe.

18. A coordinate positioning machine comprising a structure moveable within a working volume of the machine, a metrology arrangement for measuring the position of the structure within the working volume, and a drive arrangement for moving the structure around the working volume, wherein the metrology arrangement comprises a plurality of measurement transducers in a parallel arrangement for providing a corresponding respective plurality of measurements from which the position of the moveable structure is determinable, and wherein the drive arrangement comprises a plurality of actuators in a parallel arrangement of a different type to that of the metrology arrangement.

19. A coordinate positioning machine comprising a structure moveable within a working volume of the machine, a metrology arrangement for measuring the position of the structure within the working volume, and a drive arrangement for moving the structure around the working volume, wherein the metrology arrangement and drive arrangement are each arranged between the moveable structure and a fixed structure of the machine, wherein the metrology arrangement comprises a parallel arrangement of measurement transducers for providing a plurality of measurements from which the position of the moveable structure is determinable, wherein the drive arrangement comprises a plurality of mechanical linkages arranged in parallel between the moveable structure and the fixed structure, and wherein each mechanical linkage is actuated by a drive mechanism which acts between the fixed structure and the mechanical linkage.

20. A coordinate positioning machine comprising a structure moveable within a working volume of the machine, a drive arrangement for moving the structure around the working volume in fewer than six degrees of freedom, and a metrology arrangement for measuring the position of the structure within the working volume in more degrees of freedom than the drive arrangement, wherein the metrology arrangement is a mechanical metrology arrangement.

21. A method of controlling a coordinate positioning machine according to claim 1, comprising: coupling a tool to the moveable structure, using the drive arrangement to move the tool around the working volume with the metrology arrangement also coupled to the moveable structure, performing an operation with the tool, and using the metrology arrangement to determine the position of the tool within the working volume.

22. A computer program which, when run by a controller for a coordinate positioning machine, causes the controller to perform a method as claimed in claim 21.

23. A computer-readable medium having stored therein computer program instructions for controlling a coordinate positioning machine controller to perform a method as claimed in claim 21.

* * * * *